(12) United States Patent
Kwong et al.

(10) Patent No.: US 9,483,080 B2
(45) Date of Patent: Nov. 1, 2016

(54) ELECTRONIC DEVICE WITH CONVERTIBLE TOUCHSCREEN

(71) Applicant: Intel Corporation, Santa Clara, CA (US)

(72) Inventors: Wah Yiu Kwong, Beaverton, OR (US);
Hong W. Wong, Portland, OR (US);
Christine Kim, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/497,624

(22) Filed: Sep. 26, 2014

(65) Prior Publication Data

US 2016/0091929 A1    Mar. 31, 2016

(51) Int. Cl.
| | | |
|---|---|---|
| *G06F 1/16* | (2006.01) |
| *H05K 5/00* | (2006.01) |
| *H05K 7/00* | (2006.01) |
| *G09G 5/00* | (2006.01) |
| *G06F 3/041* | (2006.01) |
| *G06F 3/0488* | (2013.01) |

(52) U.S. Cl.
CPC ............ *G06F 1/1643* (2013.01); *G06F 1/162* (2013.01); *G06F 1/1616* (2013.01); *G06F 3/0416* (2013.01); *G06F 3/04886* (2013.01)

(58) Field of Classification Search
CPC .. G06F 1/1618; G06F 1/1643; G06F 1/1673; G06F 1/1692
USPC ............. 361/679.26, 679.27, 679.3, 679.55, 361/679.56, 679.08, 679.09; 345/173, 168, 345/170, 172
See application file for complete search history.

(56) References Cited

U.S. PATENT DOCUMENTS

| | | | |
|---|---|---|---|
| 5,900,848 A | 5/1999 | Haneda et al. |
| 6,826,043 B2 | 11/2004 | Chang |
| 6,829,140 B2 | 12/2004 | Shimano et al. |
| 7,164,578 B2 | 1/2007 | Wang et al. |
| 7,239,505 B2 | 7/2007 | Keely et al. |
| 7,639,479 B2 | 12/2009 | Chuang et al. |

(Continued)

FOREIGN PATENT DOCUMENTS

| | | |
|---|---|---|
| WO | WO 2014-029020 A1 | 2/2014 |
| WO | WO 2014-101098 A1 | 7/2014 |
| WO | WO 2016/048564 A1 | 3/2016 |

OTHER PUBLICATIONS

International Search Report and Written Opinion in International Application No. PCT/US2015/047045, mailed on Dec. 9, 2015, 13 pages.

(Continued)

*Primary Examiner* — Anthony Haughton
(74) *Attorney, Agent, or Firm* — Patent Capital Group

(57) ABSTRACT

Particular embodiments described herein provide for an electronic device, such as a notebook computer or laptop, that includes a circuit board coupled to a plurality of electronic components (which includes any type of components, elements, circuitry, etc.). One particular example implementation of the electronic device may include a first housing, a hinge, and a touchscreen, where the touchscreen is rotatably coupled to the first housing using the hinge. The first housing can include a display and the touchscreen can rotate from a front of the display when the electronic device is in a tablet configuration to a clamshell configuration. A template may visible on or through the touchscreen when the electronic device is in the clamshell configuration.

24 Claims, 26 Drawing Sheets

(56) References Cited

U.S. PATENT DOCUMENTS

| | | |
|---|---|---|
| 7,690,576 B2 | 4/2010 | Ladouceur |
| 7,864,517 B2 * | 1/2011 | Miller et al. ............. 361/679.27 |
| D708,177 S | 7/2014 | Honda et al. |
| D717,791 S | 11/2014 | Yun et al. |
| 2003/0165048 A1 * | 9/2003 | Bamji et al. .................. 361/681 |
| 2004/0160736 A1 | 8/2004 | Lin |
| 2006/0038795 A1 | 2/2006 | Lee |
| 2009/0040701 A1 | 2/2009 | Lin |
| 2010/0067181 A1 | 3/2010 | Bair et al. |
| 2011/0002096 A1 * | 1/2011 | Thorson ................... 361/679.04 |
| 2011/0296333 A1 | 12/2011 | Bateman et al. |
| 2012/0032887 A1 * | 2/2012 | Chiu et al. ..................... 345/168 |
| 2014/0063712 A1 | 3/2014 | Chung et al. |

OTHER PUBLICATIONS

USPTO Jan. 22, 2016 Nonfinal Office Action in U.S. Appl. No. 29/513,122, 8 pages.

USPTO Jun. 6, 2016 Notice of Allowance in U.S. Appl. No. 29/513,122, 7 pages.

* cited by examiner

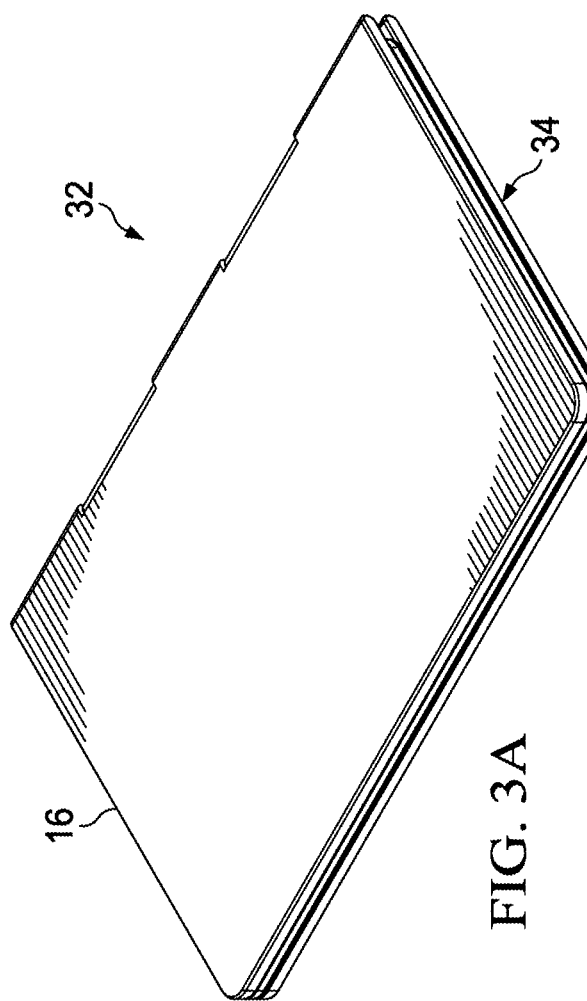

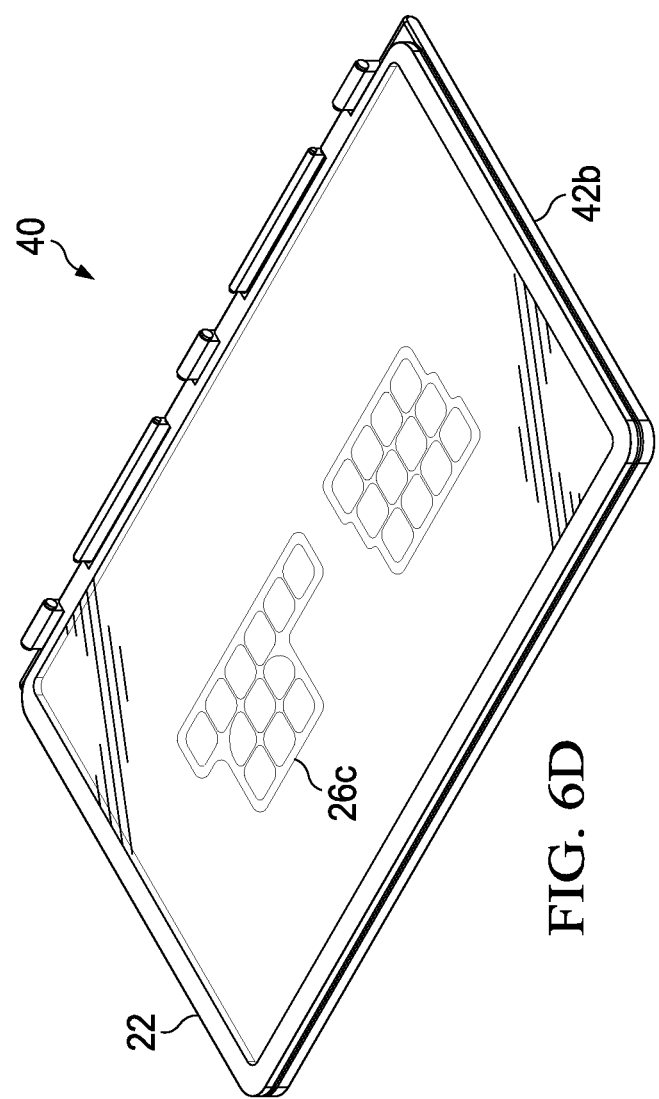

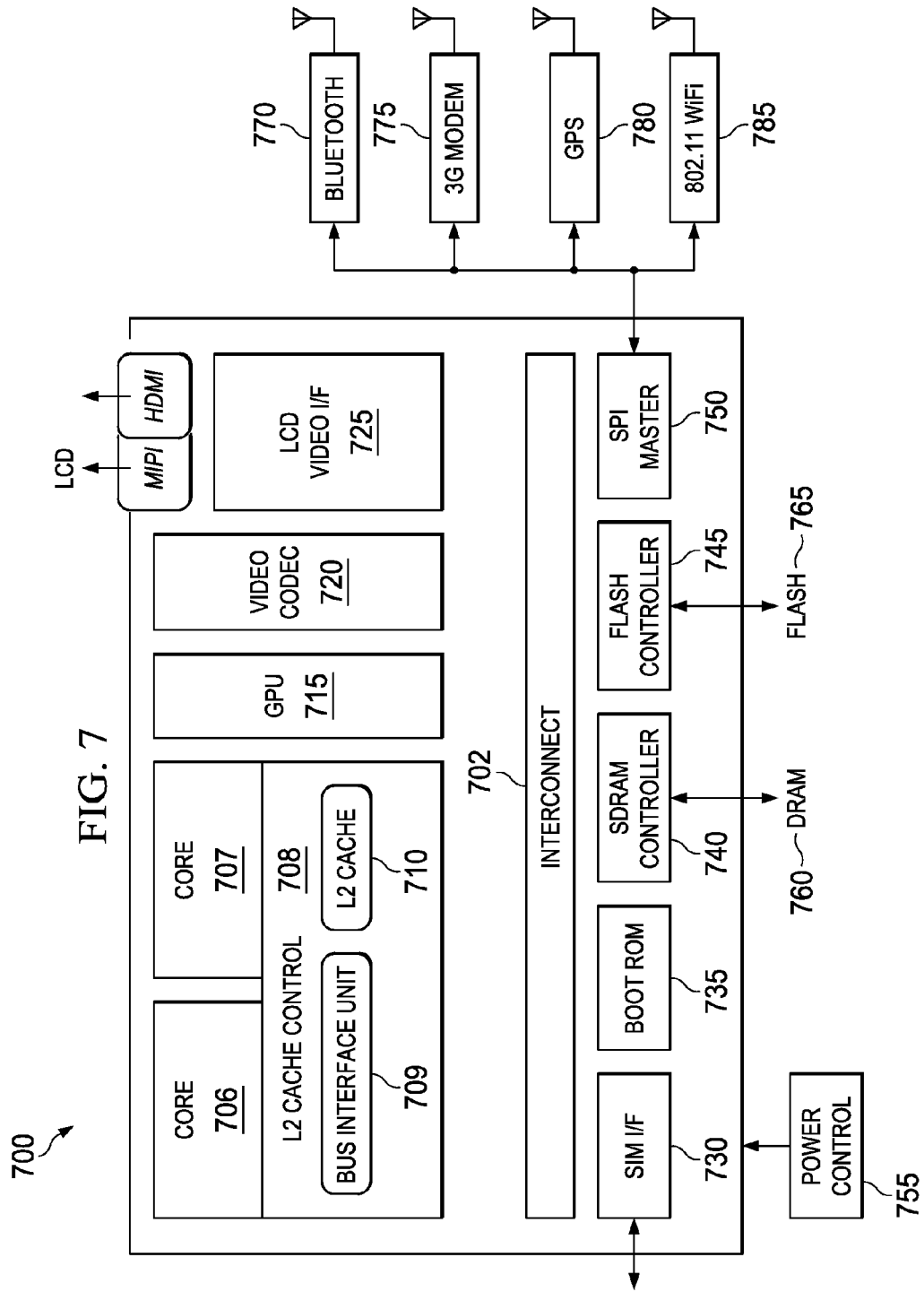

ELECTRONIC DEVICE WITH CONVERTIBLE TOUCHSCREEN

TECHNICAL FIELD

Embodiments described herein generally relate to the field of electronic devices and, more particularly, to an electronic device with a convertible touchscreen.

BACKGROUND

End users have more electronic device choices than ever before. A number of prominent technological trends are currently afoot (e.g., more computing devices, more detachable displays, etc.), and these trends are changing the electronic device landscape. One of the technological trends is a convertible or hybrid laptop. The convertible laptop is any type of computer system that has a display and can essentially function as either a laptop or a tablet computer. In many instances, the keyboard can rotate about a hinge around the display. However, when the keyboard is rotated to the back of the display, the keys of the keyboard are exposed. Hence, there is a challenge in providing an electronic device that allows for protection of the keyboard.

BRIEF DESCRIPTION OF THE DRAWINGS

Embodiments are illustrated by way of example and not by way of limitation in the FIGURES of the accompanying drawings, in which like references indicate similar elements and in which:

FIG. 3A is a simplified schematic diagram illustrating an embodiment of an electronic device, in accordance with one embodiment of the present disclosure;

FIG. 6D is a simplified flow diagram illustrating potential operations associated with one embodiment of the present disclosure;

FIG. 7 is a simplified block diagram associated with an example ARM ecosystem system on chip (SOC) of the present disclosure.

The FIGURES of the drawings are not necessarily drawn to scale, as their dimensions can be varied considerably without departing from the scope of the present disclosure.

DETAILED DESCRIPTION OF EXAMPLE EMBODIMENTS

Overview

An electronic device is provided in one example embodiment and includes a plurality of electronic components (which can include any type of components, elements, circuitry, etc.). One particular example implementation of the electronic device may include a first housing, a hinge, and a touchscreen, where the touchscreen is rotatably coupled to the first housing using the hinge. The first housing can include a display and the touchscreen can rotate from a front of the display when the electronic device is in a tablet configuration to a clamshell configuration.

In other embodiments, the electronic device can include a projector that is configured to project a keyboard on the touchscreen when the electronic device or touchscreen is in the clamshell configuration. Additionally, the electronic device can include a template, where the template is visible through the touchscreen when the electronic device (or touchscreen) is in the clamshell configuration. The template may be on an opposite side of the display when the electronic device (or touchscreen) is in a tablet configuration. In certain examples, the template can be removed and replaced with a second template. In addition, the electronic device may include a haptic surface between the touchscreen and the template when the electronic device (or touchscreen) is in a clamshell configuration. The haptic surface and give haptic feedback when the touchscreen is in use and the haptic surface can be removed and replaced with a second haptic surface.

Example Embodiments

The following detailed description sets forth example embodiments of apparatuses, methods, and systems relating to detachable display configurations for an electronic device. Features such as structure(s), function(s), and/or characteristic(s), for example, are described with reference to one embodiment as a matter of convenience; various embodiments may be implemented with any suitable one or more of the described features.

Figure 1A:
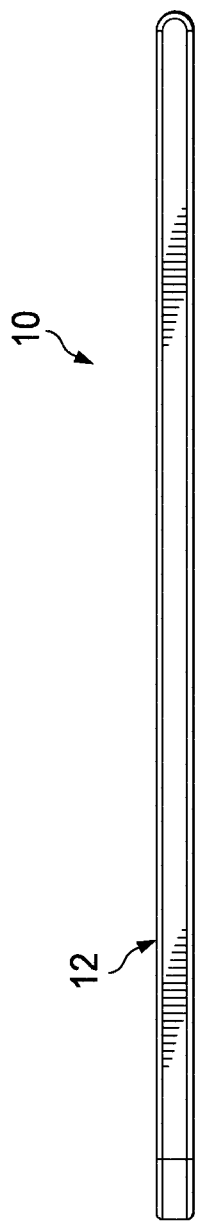
FIG. 1A is a simplified schematic diagram illustrating an embodiment of an electronic device, in accordance with one embodiment of the present disclosure.

FIG. 1A is a simplified schematic diagram illustrating an embodiment of an electronic device 10, in accordance with one embodiment of the present disclosure. Electronic device 10 may include a first housing 12. In one or more embodiments, electronic device 10 is a tablet computer. In still other embodiments, electronic device 10 may be any suitable electronic device having a display such as a mobile device, a tablet device (e.g., i-Pad™), Phablet™, a personal digital assistant (PDA), a smartphone, an audio system, a movie player of any type, a computer docking station, etc. The electronics (e.g., processor, memory, etc.) for electronic device 10 reside in first housing 12.

Figure 1B:
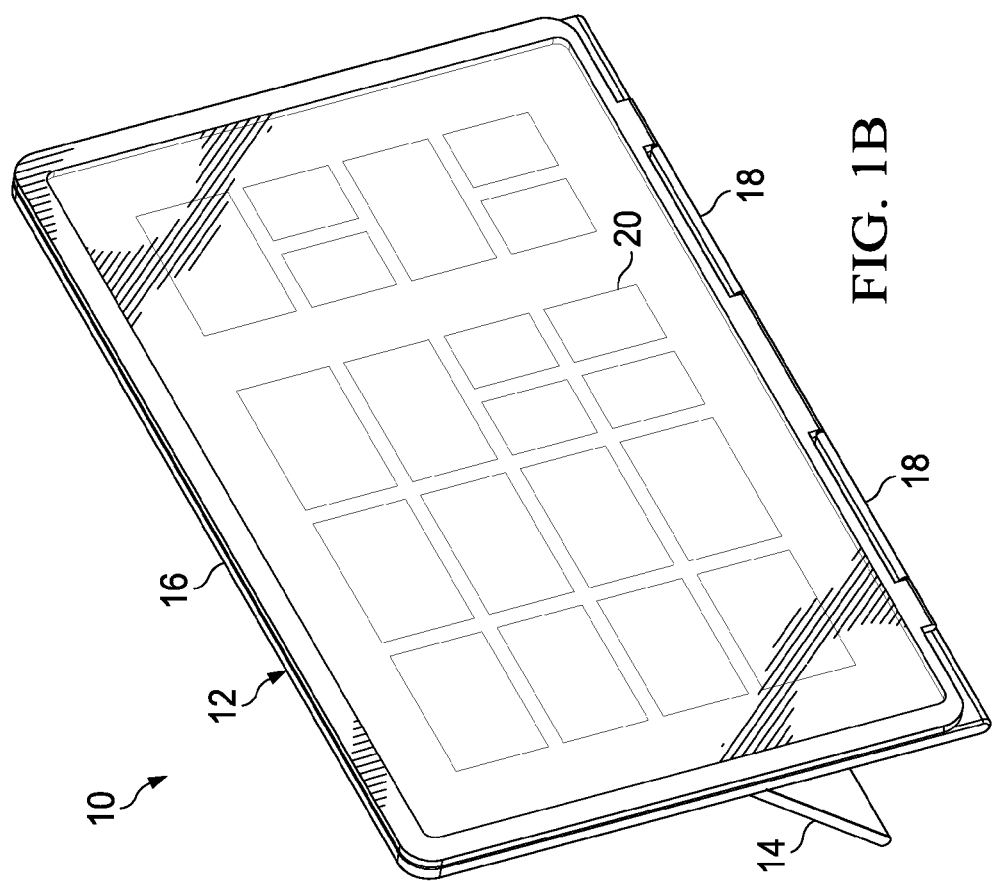
FIG. 1B is a simplified schematic diagram illustrating an embodiment of an electronic device, in accordance with one embodiment of the present disclosure.

Turning to FIG. 1B, FIG. 1B is a simplified schematic diagram of electronic device 10, in accordance with one embodiment of the present disclosure. First housing 12 can include a stand 14, a display 16, and a hinge 18. Stand 14 can be configured to support first housing 12 as illustrated in FIG. 1B.

Display 16 can display an image 20. In one or more embodiments, display 16 can be a liquid crystal display (LCD) display screen, a light-emitting diode (LED) display screen, an organic light-emitting diode (OLED) display screen, a plasma display screen, or any other suitable display screen system. Display 16 may be a touchscreen that can detect the presence and location of a touch within the display area. In another embodiment, first housing 12 may include a battery and various electronics (e.g., processor, memory, etc.) to allow first housing 12 to operate as a standalone tablet. In another embodiment, first housing 12 may include a wireless module (e.g., Wi-Fi module, Bluetooth module, etc.). In yet another embodiment, first housing 12 may include a camera, a microphone, and speakers.

Figure 1C:
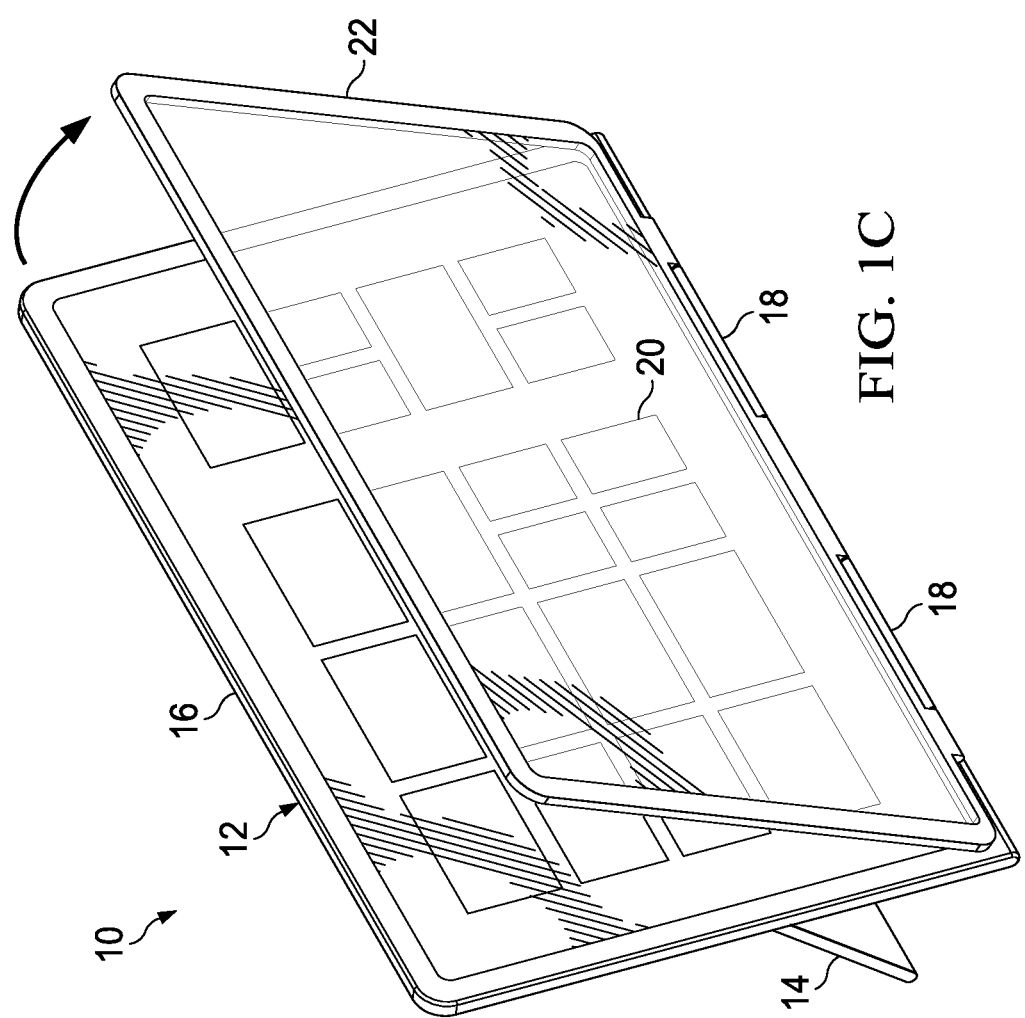
FIG. 1C is a simplified schematic diagram illustrating an embodiment of an electronic device, in accordance with one embodiment of the present disclosure.

Turning to FIG. 1C, FIG. 1C is a simplified schematic diagram of electronic device 10 in accordance with one embodiment of the present disclosure. As illustrated in FIG. 1C, touchscreen 22 has been rotated on hinge 18 away from display 16. Hinge 18 can be configured to rotatably couple display 16 and touchscreen 22. Further, hinge 18 can include connectors and mechanical retentions to provide an electrical connection between display 16 and touchscreen 22.

Figure 1D:
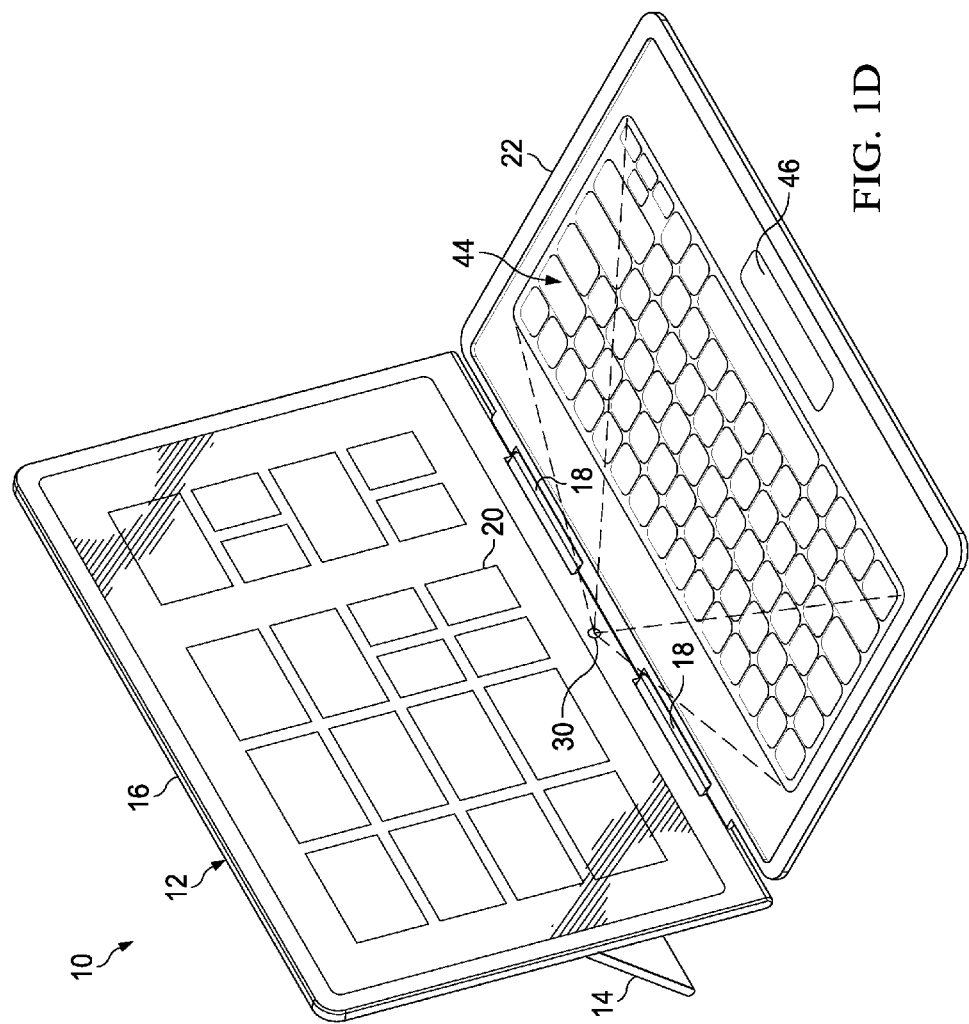
FIG. 1D is a simplified schematic diagram illustrating an embodiment of an electronic device, in accordance with one embodiment of the present disclosure.

Turning to FIG. 1D, FIG. 1D is a simplified schematic diagram of electronic device 10 in accordance with one embodiment of the present disclosure. As illustrated in FIG. 1D, touchscreen 22 has been rotated on hinge 18 such that electronic device resembles an open clamshell configuration. In this configuration, touchscreen 22 is in the approximate area of where a laptop keyboard might be located. A projector 30 located on first housing 12 can project a virtual keyboard 44 onto touchscreen 22. Virtual keyboard 44 can be used to enter text or data and can be used to interact with image 20 on display 16. In an embodiment, a touchpad 46 may also be projected onto touchscreen 22 to control a cursor or pointer on display 16.

Figure 1E:
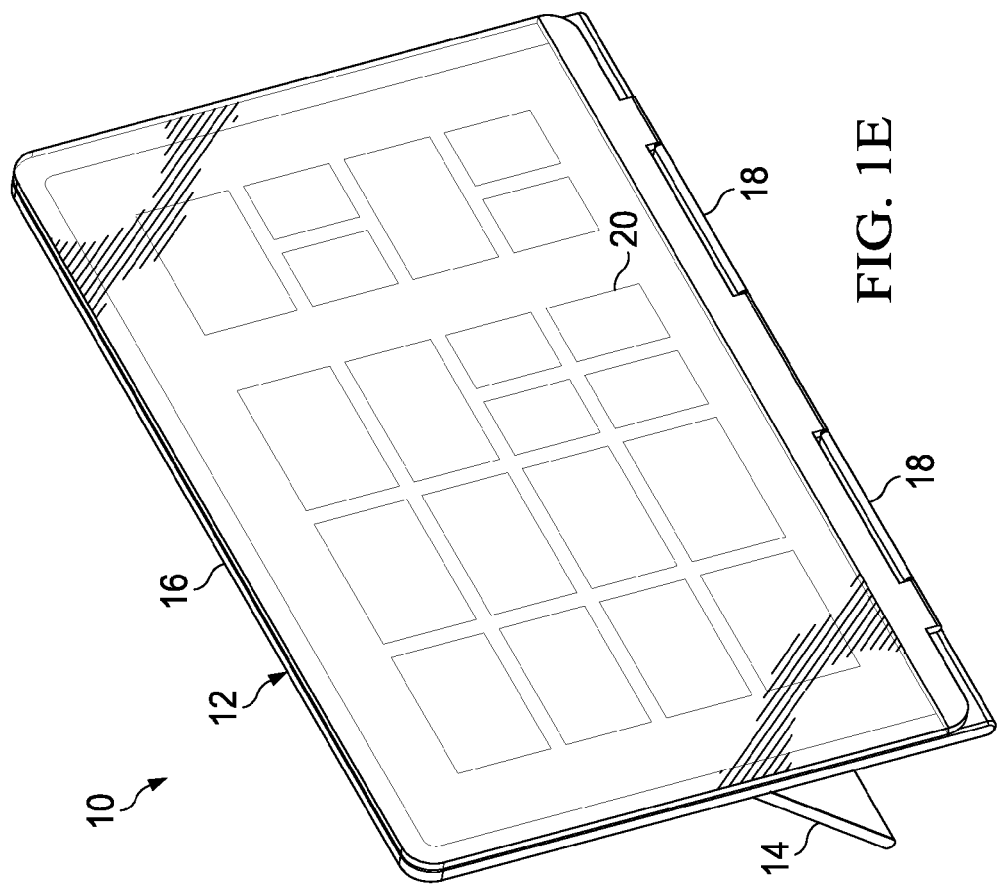
FIG. 1E is a simplified schematic diagram illustrating an embodiment of an electronic device, in accordance with one embodiment of the present disclosure.
Figure 1F:
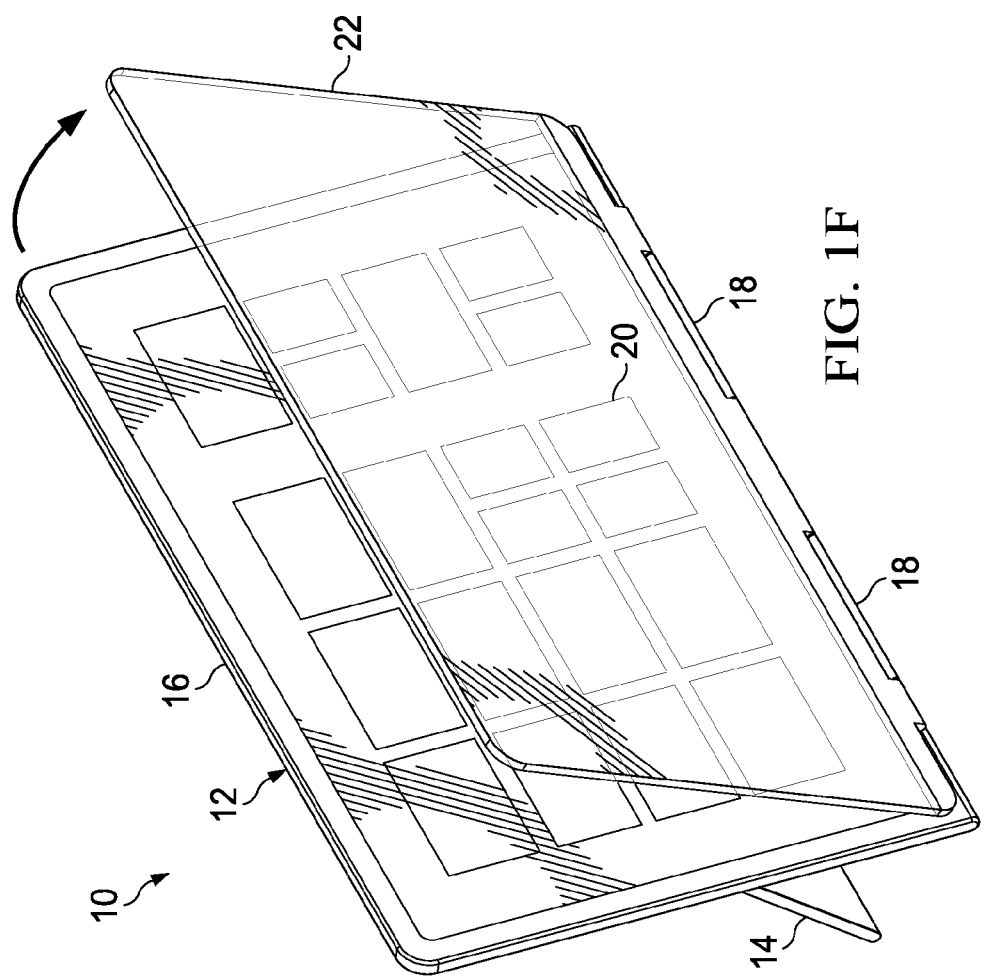
FIG. 1F is a simplified schematic diagram illustrating an embodiment of an electronic device, in accordance with one embodiment of the present disclosure.
Figure 1G:
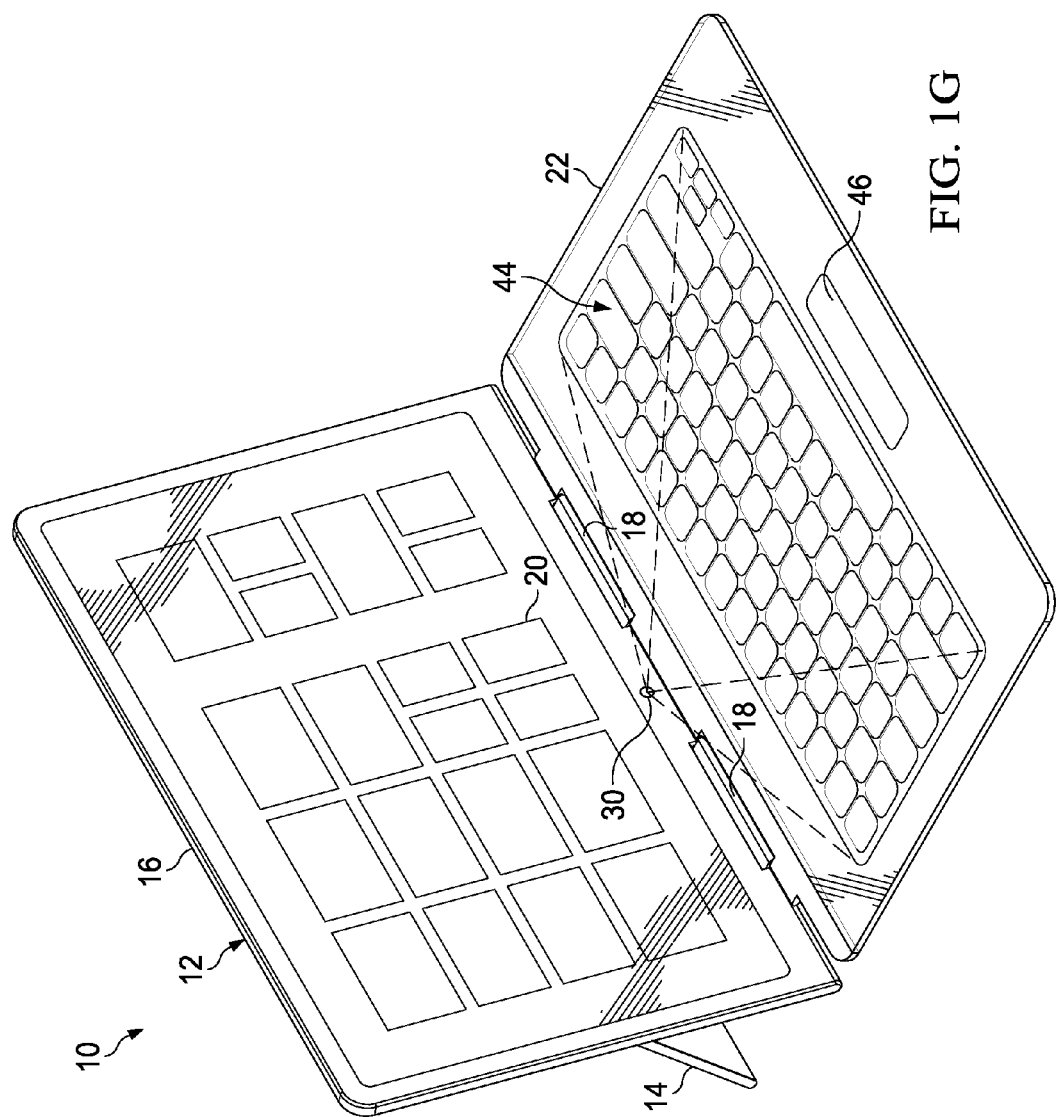
FIG. 1G is a simplified schematic diagram illustrating an embodiment of an electronic device, in accordance with one embodiment of the present disclosure.

Turning to FIG. 1E, FIG. 1E is a simplified schematic diagram of electronic device 10 in accordance with one embodiment of the present disclosure. As illustrated in FIG. 1E, touchscreen 22 covers the entire surface of display 16. Turning to FIG. 1F, FIG. 1F is a simplified schematic diagram of electronic device 10 in accordance with one embodiment of the present disclosure. As illustrated in FIG. 1F, touchscreen 22 has been rotated on hinge 18 away from display 16. Turning to FIG. 1G, FIG. 1G is a simplified schematic diagram of electronic device 10 in accordance with one embodiment of the present disclosure. As illustrated in FIG. 1G, touchscreen 22 has been rotated on hinge 18 such that electronic device resembles an open clamshell configuration. Comparing FIGS. 1B-D to FIGURES E-G, in FIGS. 1B-D a frame or border surrounds at least a portion of touchscreen 22 while in FIGS. 1E-G, touchscreen 22 does not have a frame or border.

For purposes of illustrating certain example features of electronic device 10, the following foundational information may be viewed as a basis from which the present disclosure may be properly explained. A tablet computer, or simply tablet, is a mobile computer with display, circuitry, battery, etc in a single unit. Tablets are typically equipped with sensors, including cameras, microphone, accelerometer and a touchscreen, with finger or stylus gestures replacing the typical computer mouse and keyboard. For entering data or text, an on-screen, pop-up virtual keyboard is usually used for typing. The on-screen keyboard can be difficult to use and some users prefer a traditional keyboard/display configuration such as open clamshell configuration. However, adding a keyboard attachment or dock can be troublesome for some users.

Particular embodiments described herein provide for an electronic device, such as a tablet computer, notebook computer, laptop, cellphone, or other electronic device that includes a circuit board coupled to a plurality of electronic components (which includes any type of components, elements, circuitry, etc.). The electronic device may also include a touchscreen rotatably coupled to the display by a hinge. The electronic device can have at least two configurations. One is where the touchscreen is on the display as in a traditional tablet. In another configuration the touchscreen can be rotated away from the display to create a keyboard similar to an add on keyboard attachment or a keyboard in a clamshell or laptop computer. The touchscreen can be integrated with haptic features (e.g., a haptic actuator). In addition, an interchangeable template can be used with the touchscreen to allow for many different variations of keyboards. In an example, the design of electronic device does not require any new added external component and allows for a form factor design with a rotation hinge coupled to the touchscreen.

Figure 2A:
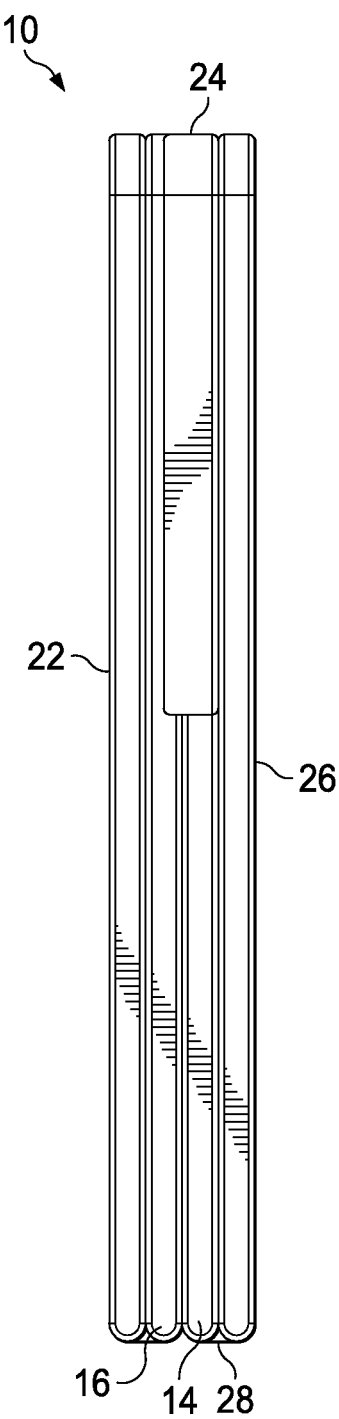
FIG. 2A is a simplified schematic diagram illustrating an embodiment of an electronic device, in accordance with one embodiment of the present disclosure.

Turning to FIG. 2A, FIG. 2A is a simplified schematic diagram of electronic device 10 in accordance with one embodiment of the present disclosure. As illustrated in FIG. 2A, electronic device 10 can include stand 14, display 16, touchscreen 22, electrical components for electronic device 10, a touchscreen template 26, and a template hinge 28.

Template hinge 28 can be configured to allow touchscreen template 26 to rotate about three hundred and sixty degrees (360°) relative to display 16.

Figure 2B:
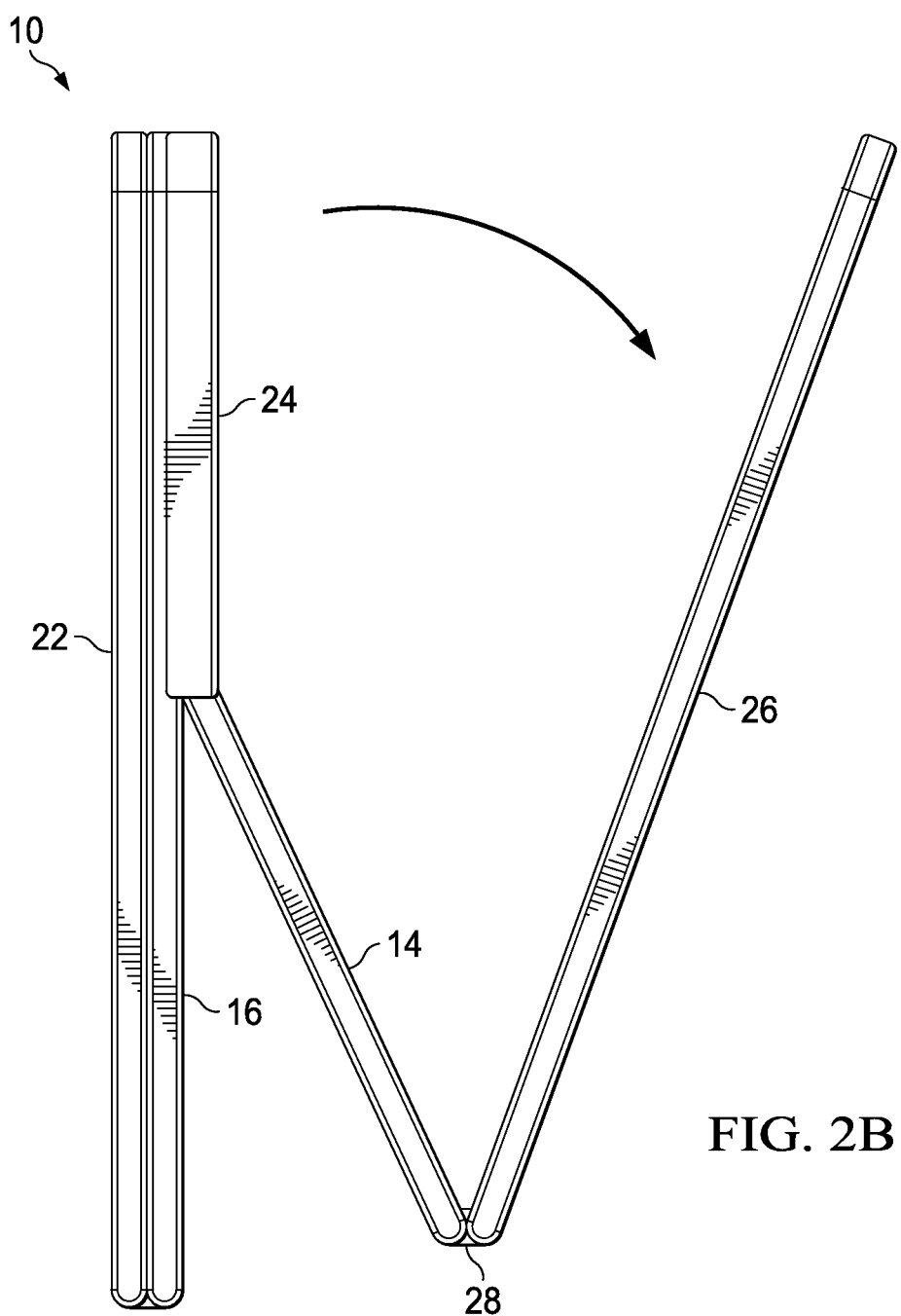
FIG. 2B is a simplified schematic diagram illustrating an embodiment of an electronic device, in accordance with one embodiment of the present disclosure.
Figure 2C:
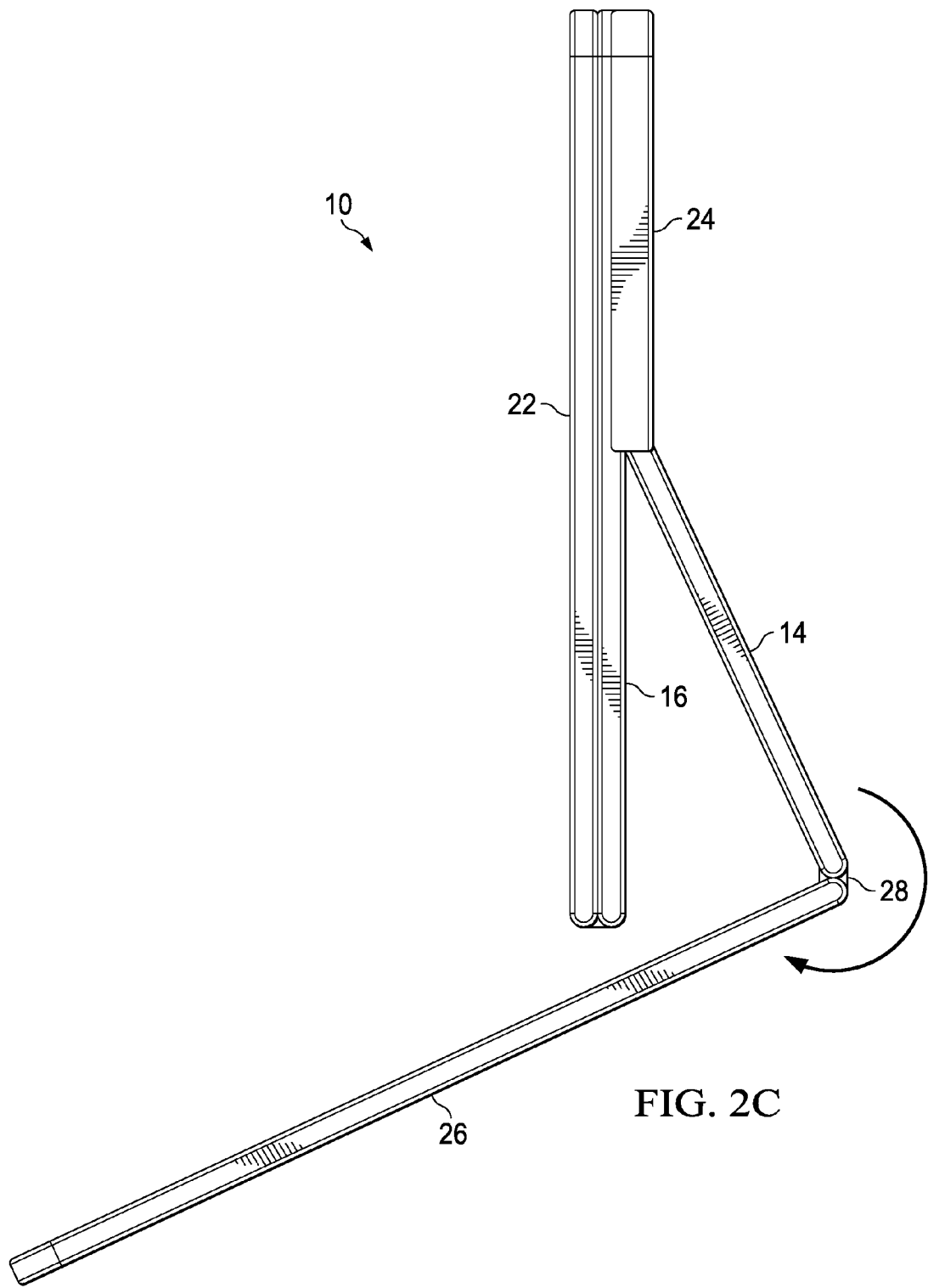
FIG. 2C is a simplified schematic diagram illustrating an embodiment of an electronic device, in accordance with one embodiment of the present disclosure.

Turning to FIG. 2B, FIG. 2B is a simplified schematic diagram illustrating an embodiment of an electronic device 10, in accordance with one embodiment of the present disclosure. As illustrated in FIG. 2B, touchscreen template 26 has been rotated on template hinge 28 away from display 16. Turning to FIG. 2C, FIG. 2C is a simplified schematic diagram illustrating an embodiment of electronic device 10, in accordance with one embodiment of the present disclosure. As illustrated in FIG. 2C, touchscreen template 26 has been rotated on template hinge 28 over more than one hundred and eighty degrees (180°) such that touchscreen template 26 is at least partially in front of display 16.

Figure 2D:
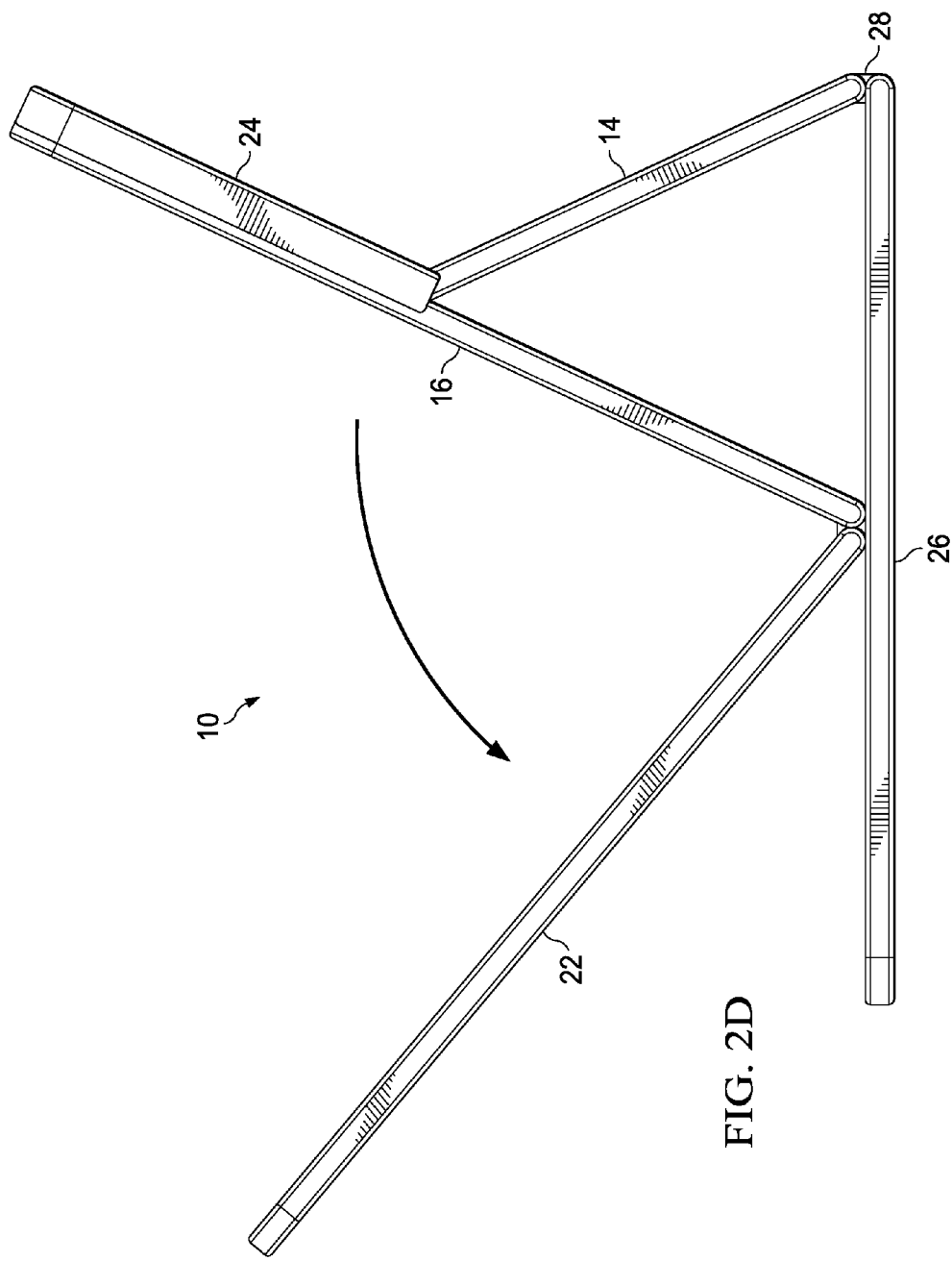
FIG. 2D is a simplified schematic diagram illustrating an embodiment of an electronic device, in accordance with one embodiment of the present disclosure.

Turning to FIG. 2D, FIG. 2D is a simplified schematic diagram illustrating an embodiment of electronic device 10, in accordance with one embodiment of the present disclosure. As illustrated in FIG. 2D, touchscreen template 26 has been rotated on template hinge 28 such that touchscreen template 26 is at least partially in front of display 16. In addition, touchscreen 22 has been rotated on hinge 18 away from display 16.

Figure 2E:
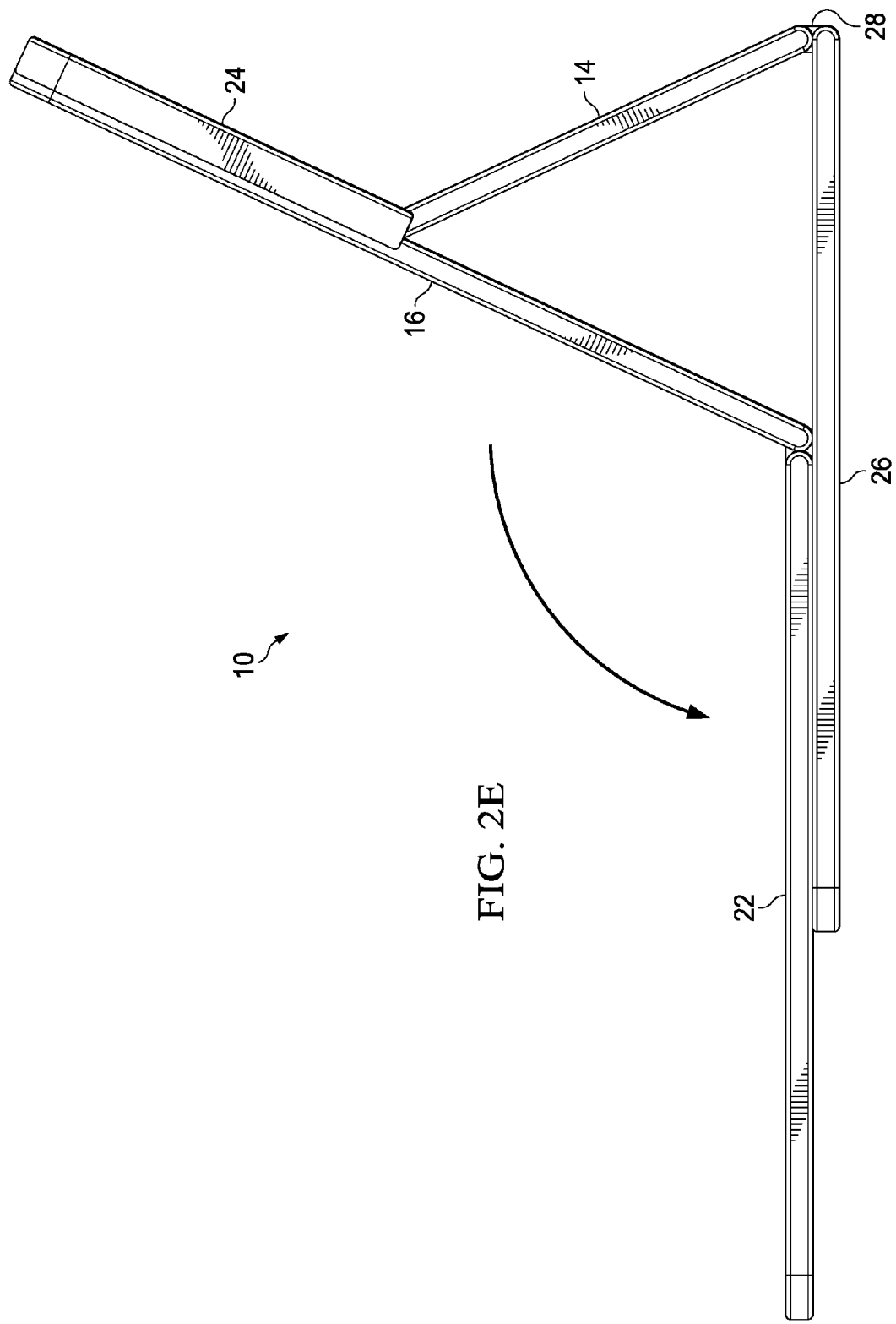
FIG. 2E is a simplified schematic diagram illustrating an embodiment of n electronic device, in accordance with one embodiment of the present disclosure.

Turning to FIG. 2E, FIG. 2E is a simplified schematic diagram illustrating an embodiment of electronic device 10, in accordance with one embodiment of the present disclosure. As illustrated in FIG. 2E, touchscreen 22 has been rotated on hinge 18 away from display 16 such that touchscreen 22 is resting on touchscreen template 26. In this configuration, a keyboard or user guide can be visible through touchscreen 22 to assist a user in interacting with images or data on display 16.

Turning to FIG. 3A, FIG. 3A is a simplified schematic diagram illustrating an embodiment of a clamshell electronic device 32 in a closed clamshell configuration, in accordance with one embodiment of the present disclosure. In an embodiment, clamshell electronic device 32 can include display 16 and a second housing 34. In one or more embodiments, clamshell electronic device 32 is a laptop or clamshell electronic device.

Figure 3B:
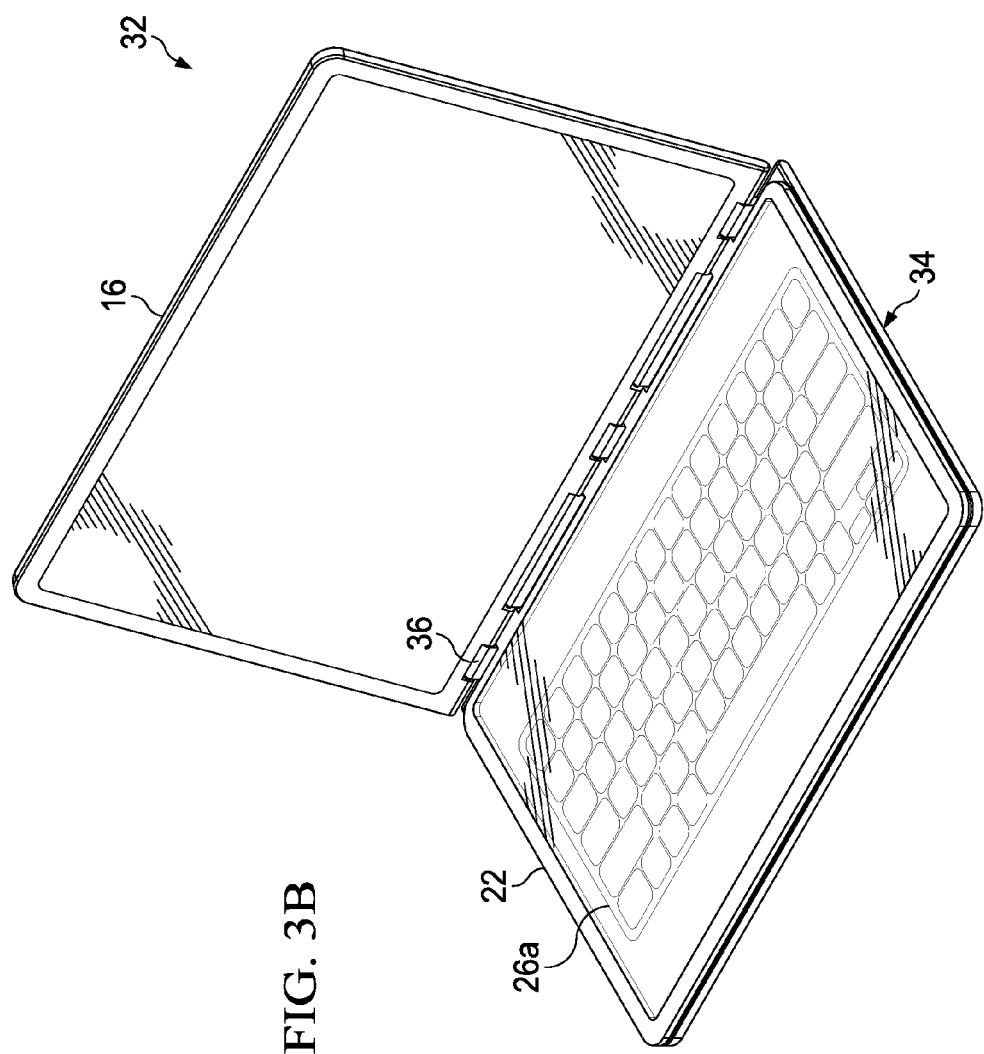
FIG. 3B is a simplified schematic diagram illustrating an embodiment of an electronic device, in accordance with one embodiment of the present disclosure.

Turning to FIG. 3B, FIG. 3B is a simplified schematic diagram illustrating an embodiment of clamshell electronic device 32 in an open clamshell configuration, in accordance with one embodiment of the present disclosure. Clamshell electronic device 32 can include display 16, second housing 34, and clamshell hinge 36. Second housing 34 can include touchscreen 22 and touchscreen template 26a. Clamshell hinge 36 can be configured to rotatably couple display 16 to second housing 34.

Figure 3C:
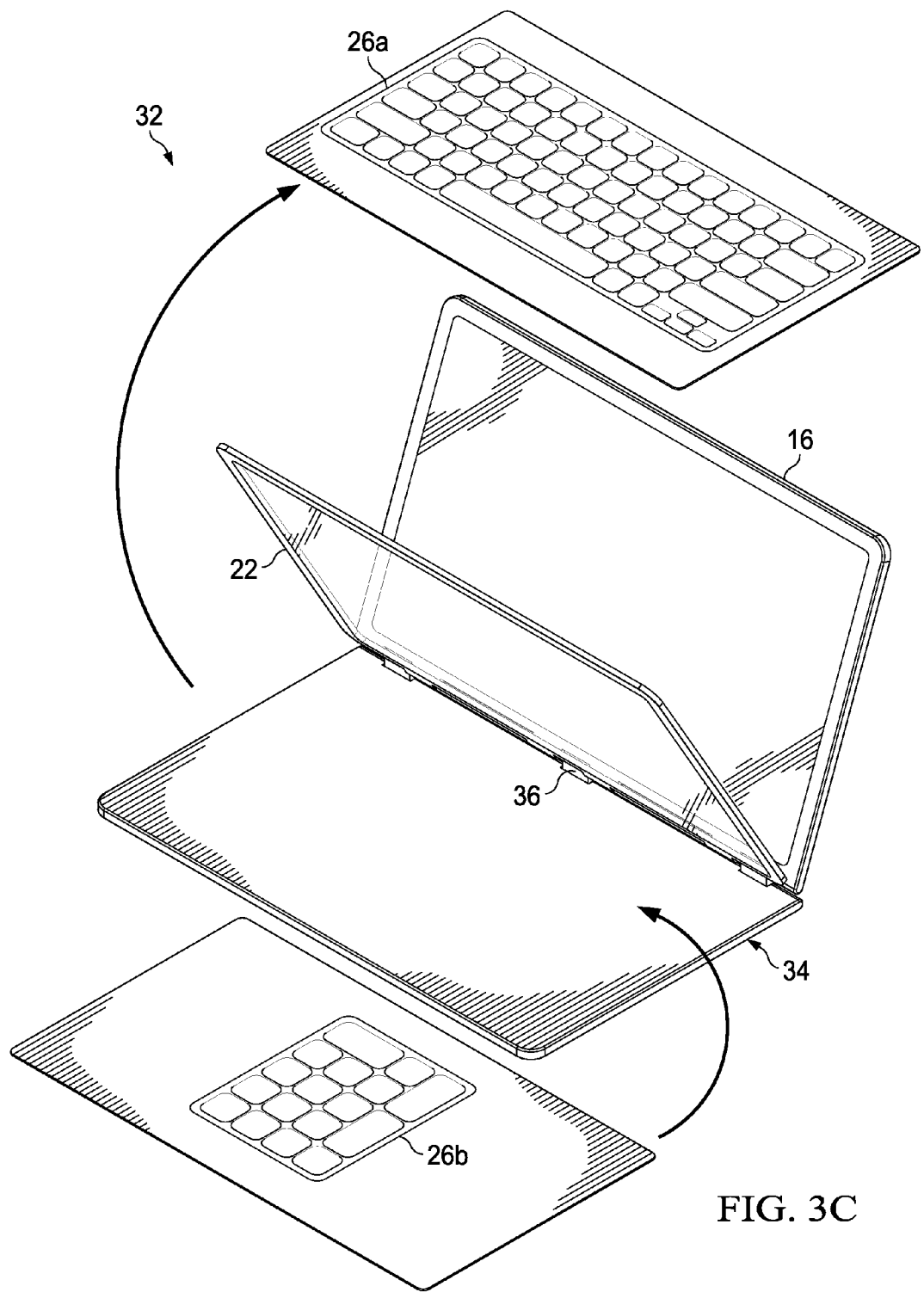
FIG. 3C is a simplified schematic diagram illustrating an embodiment of a portion of an electronic device in accordance with one embodiment of the present disclosure.

Turning to FIG. 3C, FIG. 3C is a simplified schematic diagram illustrating an embodiment of clamshell electronic device 32, in accordance with one embodiment of the present disclosure. As illustrated in FIG. 3C, touchscreen 22 has been rotated on clamshell hinge such that touchscreen template 26a can be removed and a new touchscreen template 26b and be inserted into second housing 34. In an example, touchscreen template 26a may be a QWERTY keyboard and touchscreen template 26b may be a numeric keyboard.

Figure 3D:
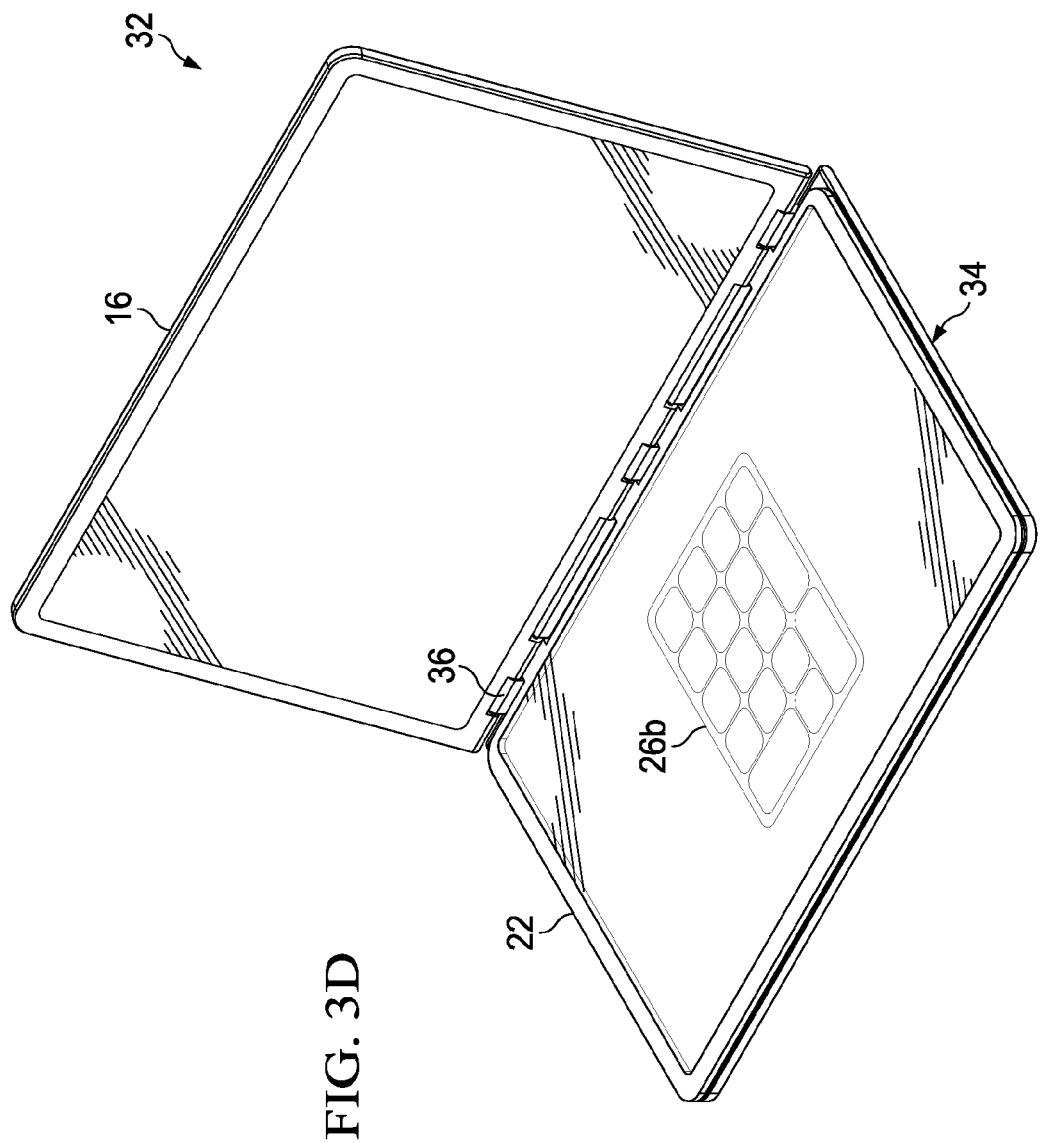
FIG. 3D is a simplified schematic diagram illustrating an embodiment of an electronic device, in accordance with one embodiment of the present disclosure.

Turning to FIG. 3D, FIG. 3D is a simplified schematic diagram illustrating an embodiment of clamshell electronic device 32, in accordance with one embodiment of the present disclosure. As illustrated in FIG. 3D, touchscreen template 26a (shown in FIG. 3A) has been replaced with touchscreen template 26b. This allows for different touchscreen templates to be used with clamshell electronic device 32.

Figure 4A:
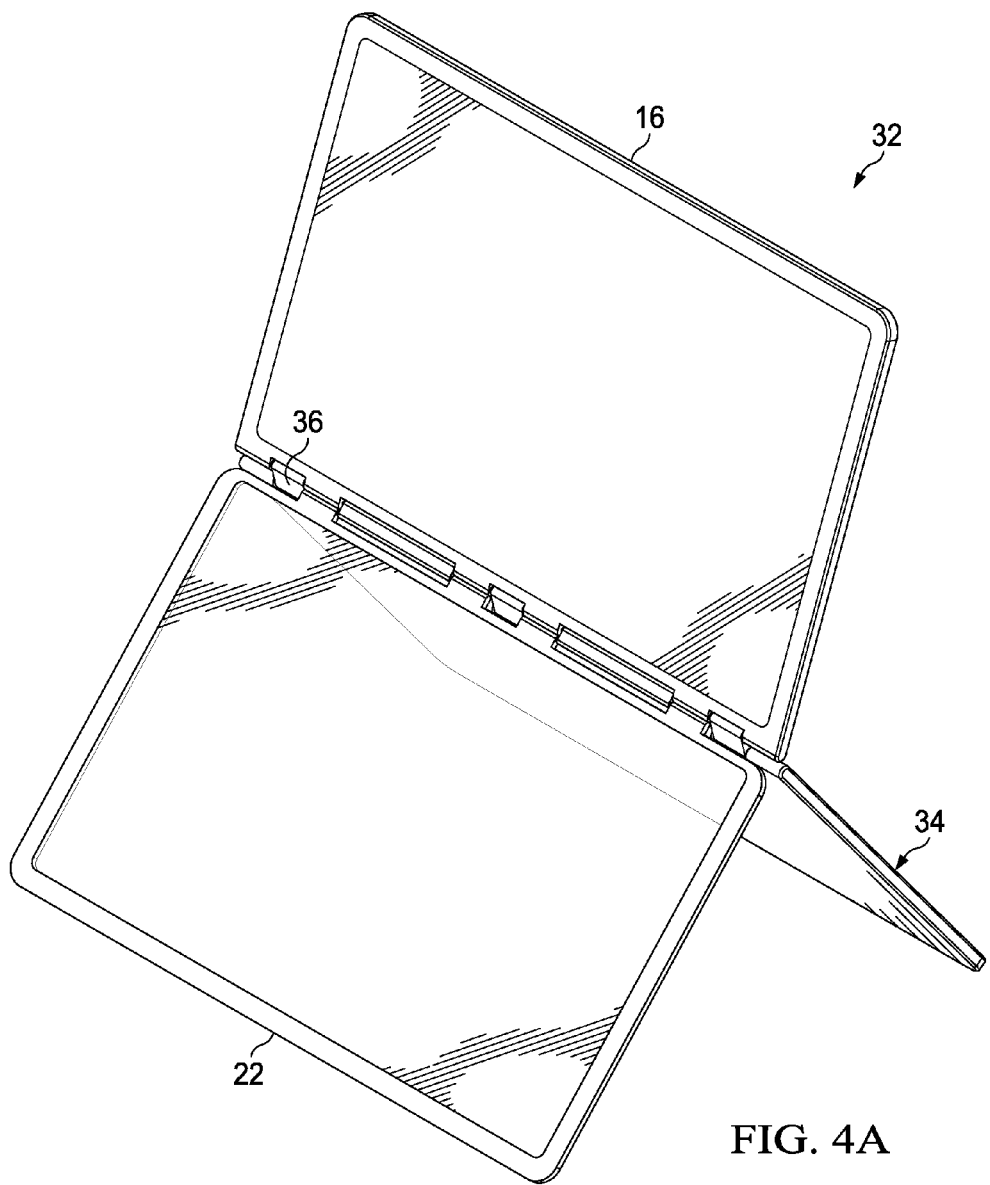
FIG. 4A is a simplified flow diagram illustrating potential operations associated with one embodiment of the present disclosure.

Turning to FIG. 4A, FIG. 4A is a simplified schematic diagram illustrating an embodiment of clamshell electronic device 32, in accordance with one embodiment of the present disclosure. As illustrated in FIG. 4A, touchscreen 22 has been rotated on clamshell hinge 36 such that touchscreen 22 is about one hundred and twenty degrees (120°) relative to display 16 and second housing 34. In addition, display 16 has been rotated on clamshell hinge 36 such that display 16 is about 120° relative to second housing 34. In this configuration, touchscreen 22 and second housing 34 can provide a base or stand for display 16.

Figure 4B:
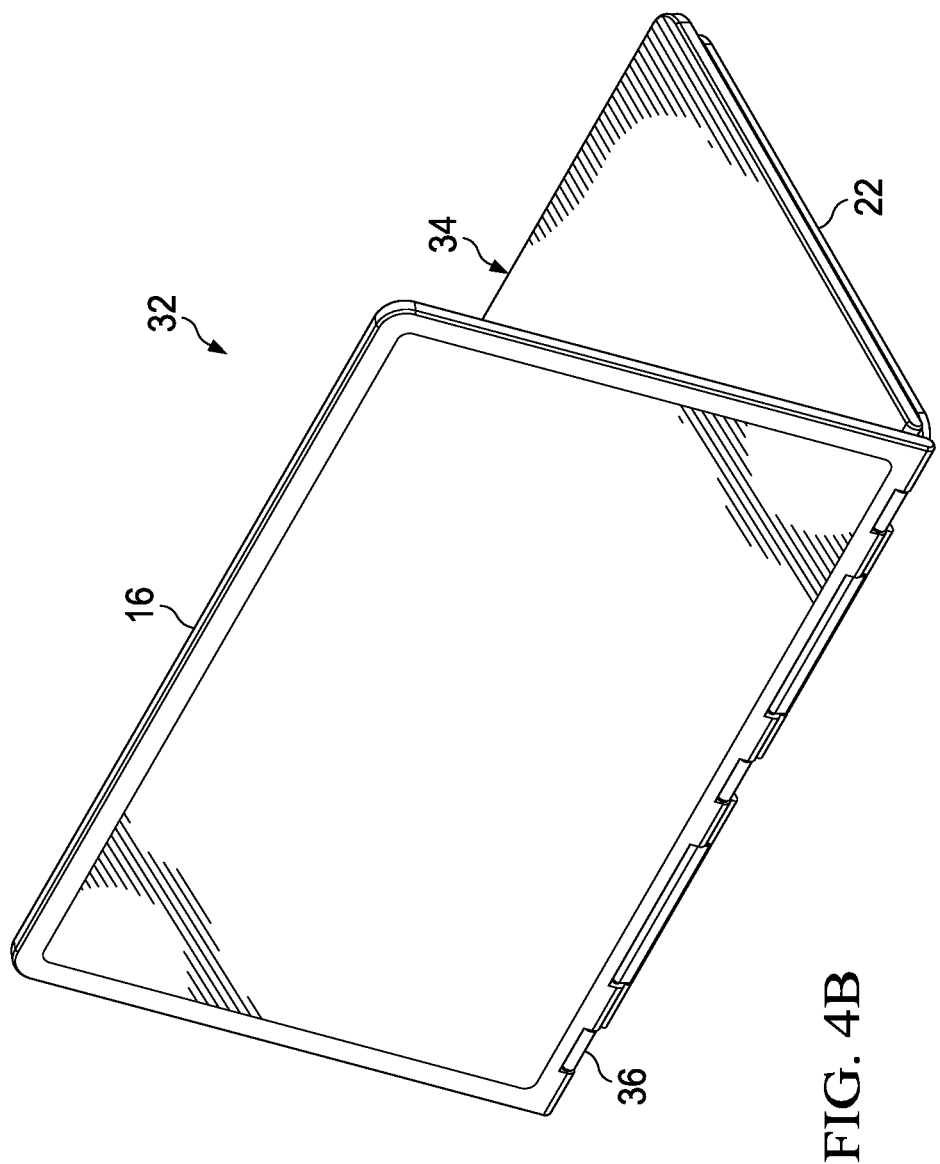
FIG. 4B is a simplified flow diagram illustrating potential operations associated with one embodiment of the present disclosure.

Turning to FIG. 4B, FIG. 4B is a simplified schematic diagram illustrating an embodiment of clamshell electronic device 32, in accordance with one embodiment of the present disclosure. As illustrated in FIG. 4B, touchscreen 22 and second housing 34 have been rotated on clamshell hinge 36 such that clamshell electronic device 32 is in a movie mode type configuration.

Figure 5A:
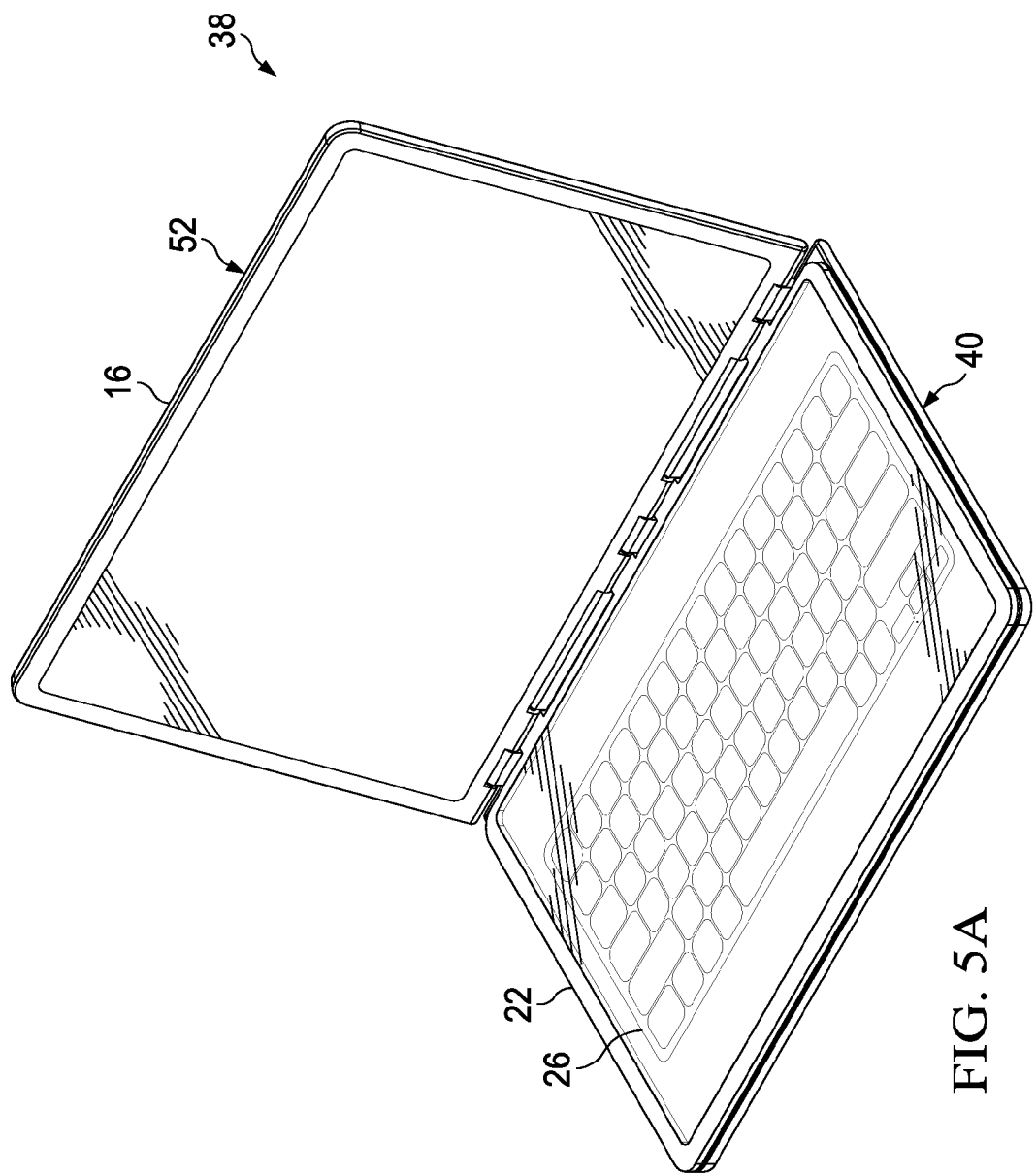
FIG. 5A is a simplified flow diagram illustrating potential operations associated with one embodiment of the present disclosure.

Turning to FIG. 5A, FIG. 5A is a simplified schematic diagram illustrating an embodiment of a detachable electronic device 38, in accordance with one embodiment of the present disclosure. Detachable electronic device 38 can include display 16, a detachable first housing 52, and a detachable second housing 40. In an embodiment, detachable first housing 52 may be a standalone tablet.

Figure 5B:
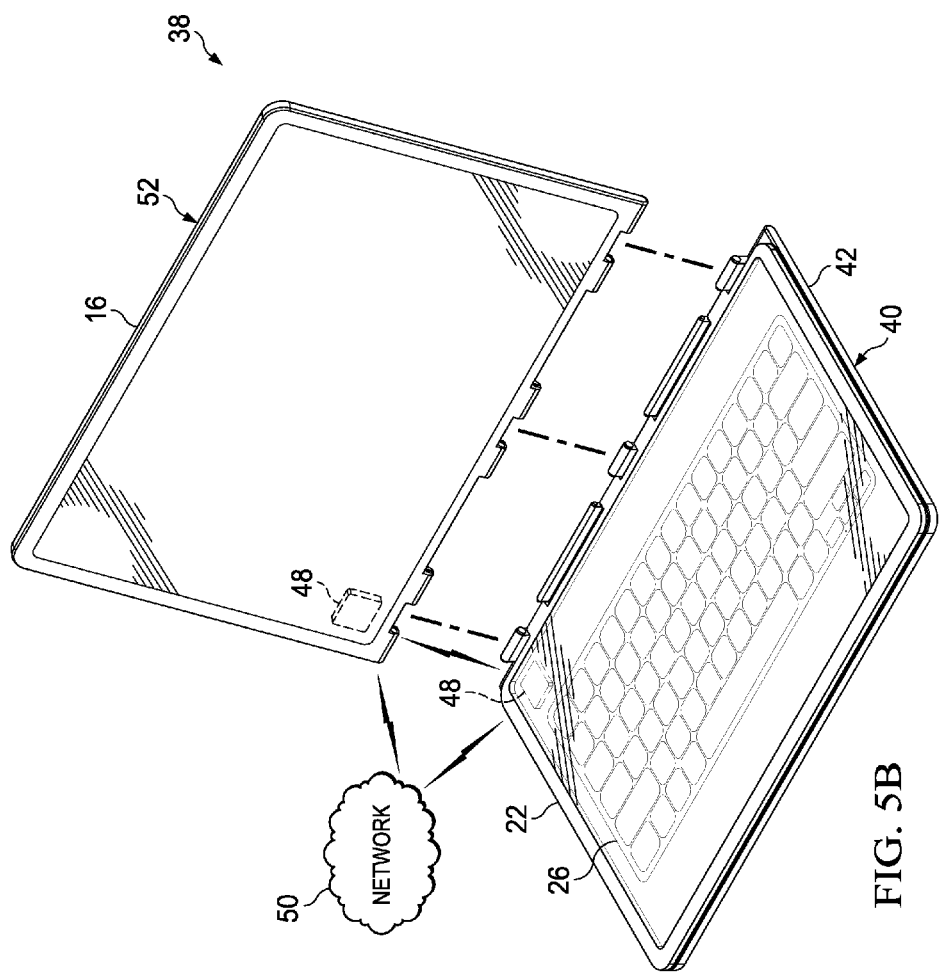
FIG. 5B is a simplified flow diagram illustrating potential operations associated with one embodiment of the present disclosure.

Turning to FIG. 5B, FIG. 5B is a simplified schematic diagram illustrating an embodiment of a detachable electronic device 38, in accordance with one embodiment of the present disclosure. As illustrated in FIG. 5B, detachable first housing 52 has been detached from detachable second housing 40. Detachable first housing 52 and detachable second housing 40 may each include a wireless module 48.

Wireless module 48 (e.g., Wi-Fi module, Bluetooth module, WiDi module, or other wireless communication circuitry) can be configured to allow detachable first housing 52 and detachable second housing 40 to communicate with each other and with a network 50 using a wireless connection. The wireless connection may be any 3G/4G/LTE cellular wireless, WiFi/WiMAX connection, WiDi connection, or some other similar wireless connection. In an embodiment, the wireless connection may be a wireless personal area network (WPAN) to interconnect detachable first housing 52, detachable second housing 40, and network 50 within a relatively small area (e.g., Bluetooth™, invisible infrared light, Wi-Fi, WiDi, etc.). In another embodiment, the wireless connection may be a wireless local area network (WLAN) that links detachable first housing 52, detachable second housing 40, and network 50 over a relatively short distance using a wireless distribution method, usually providing a connection through an access point for Internet access. The use of spread-spectrum or OFDM technologies may allow detachable first housing 52 and detachable second housing 40 to move around within a local coverage area, and still remain connected each other and network 50.

Network 50 may be a series of points or nodes of interconnected communication paths for receiving and transmitting packets of information that propagate through network 50. Network 50 offers a communicative interface and may be any local area network (LAN), wireless local area network (WLAN), metropolitan area network (MAN), Intranet, Extranet, WAN, virtual private network (VPN), or any other appropriate architecture or system that facilitates communications in a network environment. Network 50 can comprise any number of hardware or software elements coupled to (and in communication with) each other through a communications medium.

Figure 6A:
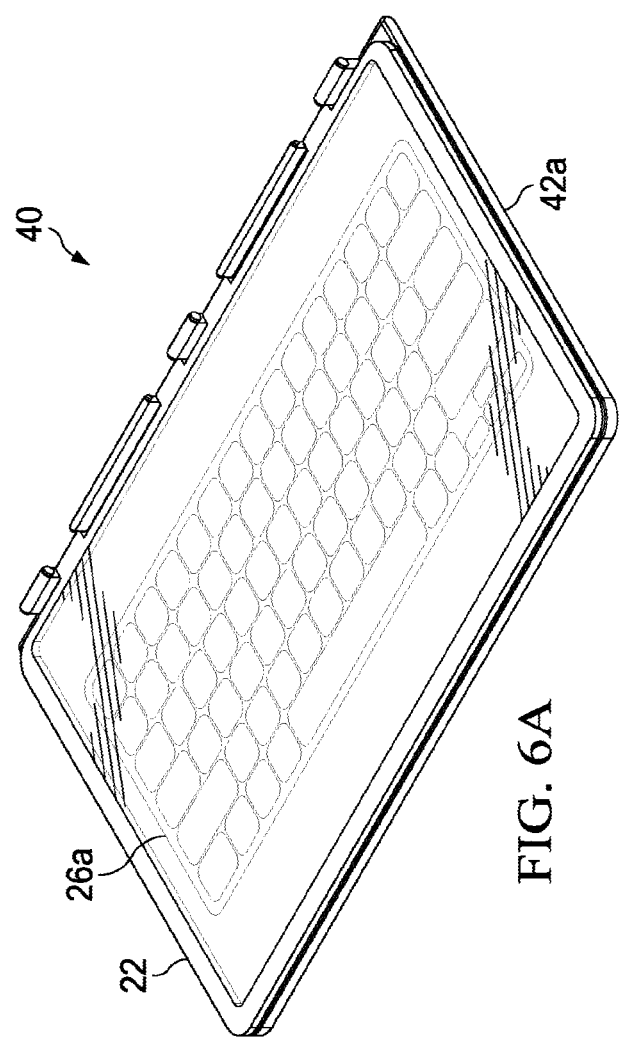
FIG. 6A is a simplified flow diagram illustrating potential operations associated with one embodiment of the present disclosure.
Figure 6B:
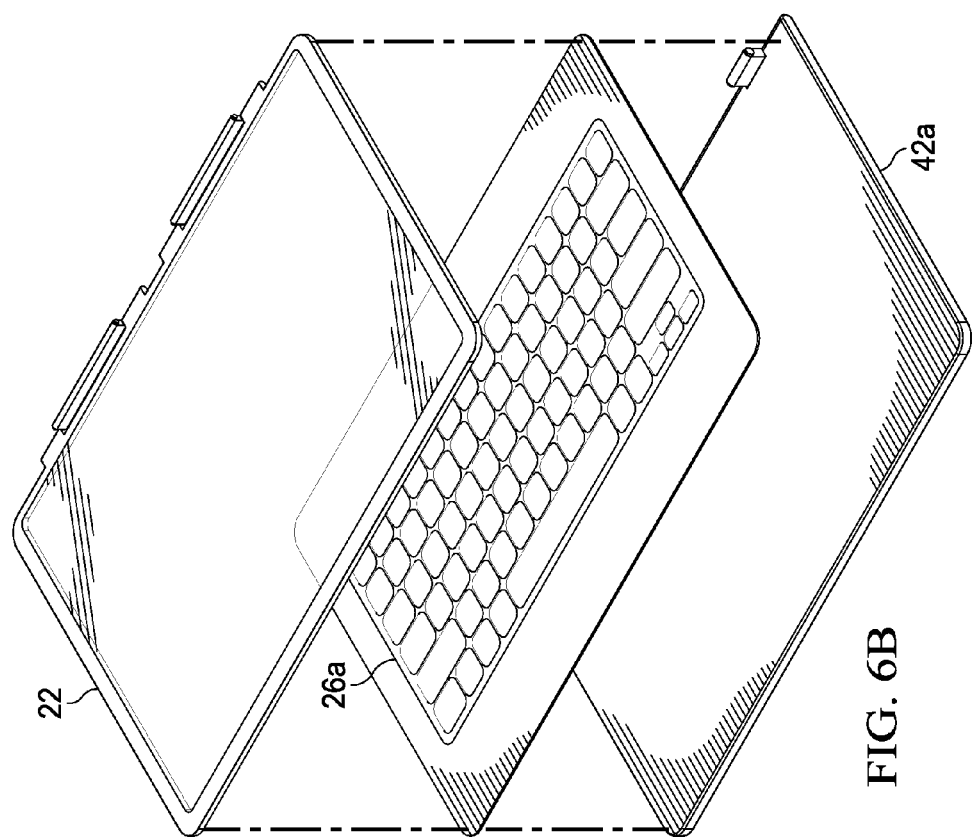
FIG. 6B is a simplified flow diagram illustrating potential operations associated with one embodiment of the present disclosure.

Turning to FIG. 6A, FIG. 6A is a simplified schematic diagram illustrating an embodiment of a detachable second housing 40, in accordance with one embodiment of the present disclosure. Detachable second housing 40 can include touchscreen 22, touchscreen template 26a, and a haptic surface 42a. Haptic surface 42a can provide haptic feedback when touchscreen 22 is used by a user. Turning to FIG. 6B, FIG. 6B is a simplified schematic diagram illustrating an embodiment of a detachable second housing 40, in accordance with one embodiment of the present disclosure. As illustrated in FIG. 6B touchscreen 22, touchscreen template 26a, and haptic surface 42a can be separated.

Figure 6C:
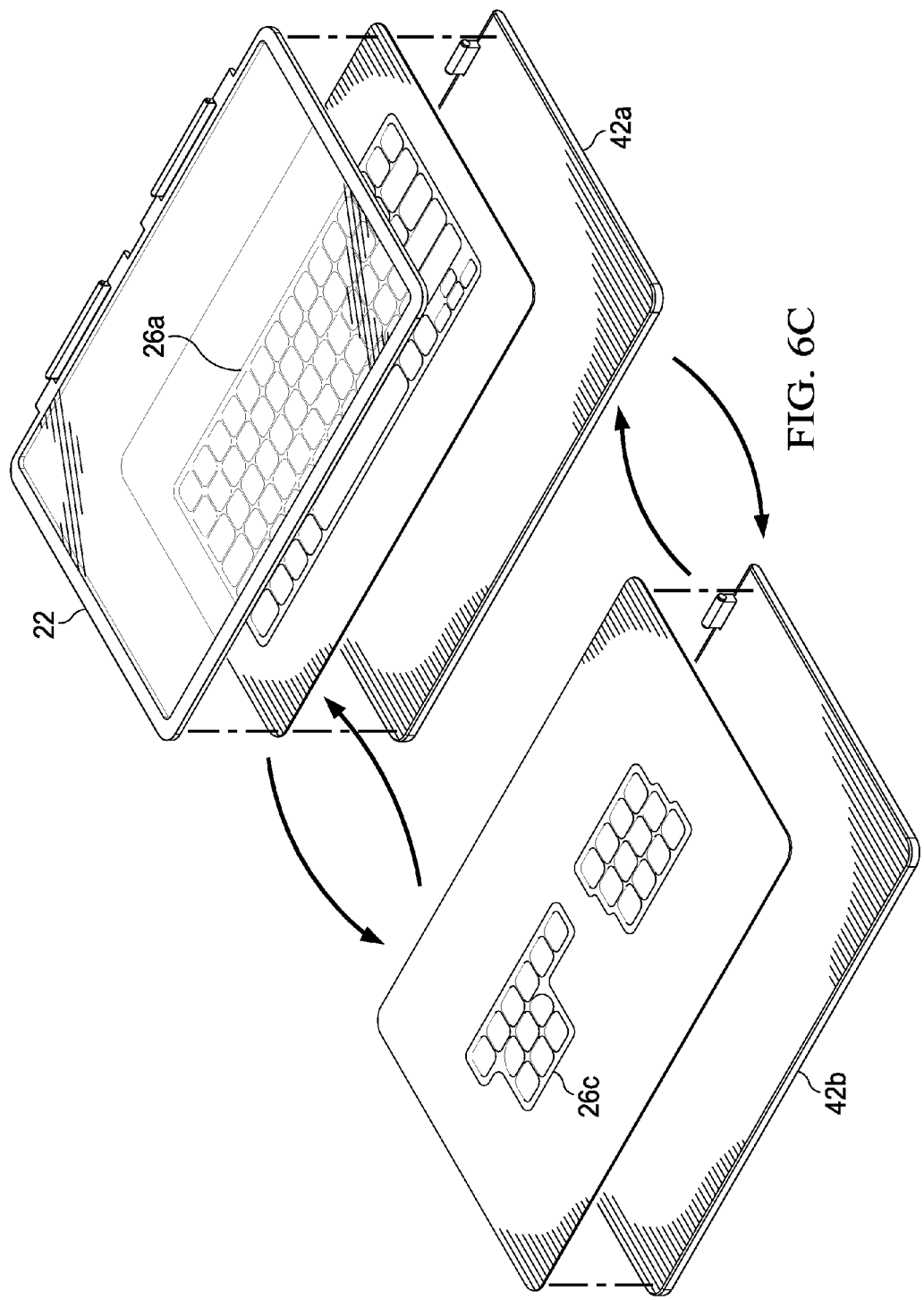
FIG. 6C is a simplified flow diagram illustrating potential operations associated with one embodiment of the present disclosure.

Turning to FIG. 6C, FIG. 6C is a simplified schematic diagram illustrating an embodiment of a detachable second housing 40, in accordance with one embodiment of the present disclosure. As illustrated in FIG. 6C, when touchscreen 22, touchscreen template 26a, and haptic surface 42a are separated, touchscreen template 26a can be replaced with touchscreen template 26c and haptic surface 42a can be replaced with haptic surface 42b. Turning to FIG. 6D, FIG. 6D is a simplified schematic diagram illustrating an embodiment of a detachable second housing 40, in accordance with one embodiment of the present disclosure. As illustrated in FIG. 6D, touchscreen template 26a has been replaced with touchscreen template 26c and haptic surface 42a has been replaced with haptic surface 42b.

Turning to FIG. 7, FIG. 7 is a simplified block diagram associated with an example ARM ecosystem SOC 700 of the present disclosure. At least one example implementation of the present disclosure can include the convertible touchscreen features discussed herein and an ARM component. For example, the example of FIG. 7 can be associated with any ARM core (e.g., A-9, A-15, etc.). Further, the architecture can be part of any type of tablet, smartphone (inclusive of Android™ phones, iPhones™), iPad™, Google Nexus™, Microsoft Surface™, personal computer, server, video processing components, laptop computer (inclusive of any type of notebook), Ultrabook™ system, any type of touch-enabled input device, etc.

In this example of FIG. 7, ARM ecosystem SOC 700 may include multiple cores 706-707, an L2 cache control 708, a bus interface unit 709, an L2 cache 710, a graphics processing unit (GPU) 715, an interconnect 702, a video codec 720, and a liquid crystal display (LCD) I/F 725, which may be associated with mobile industry processor interface (MIPI)/high-definition multimedia interface (HDMI) links that couple to an LCD.

ARM ecosystem SOC 700 may also include a subscriber identity module (SIM) I/F 730, a boot read-only memory (ROM) 735, a synchronous dynamic random access memory (SDRAM) controller 740, a flash controller 745, a serial peripheral interface (SPI) master 750, a suitable power control 755, a dynamic RAM (DRAM) 760, and flash 765. In addition, one or more example embodiments include one or more communication capabilities, interfaces, and features such as instances of Bluetooth™ 770, a 3G modem 775, a global positioning system (GPS) 780, and an 802.11 Wi-Fi 785.

In operation, the example of FIG. 7 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Figure 8:
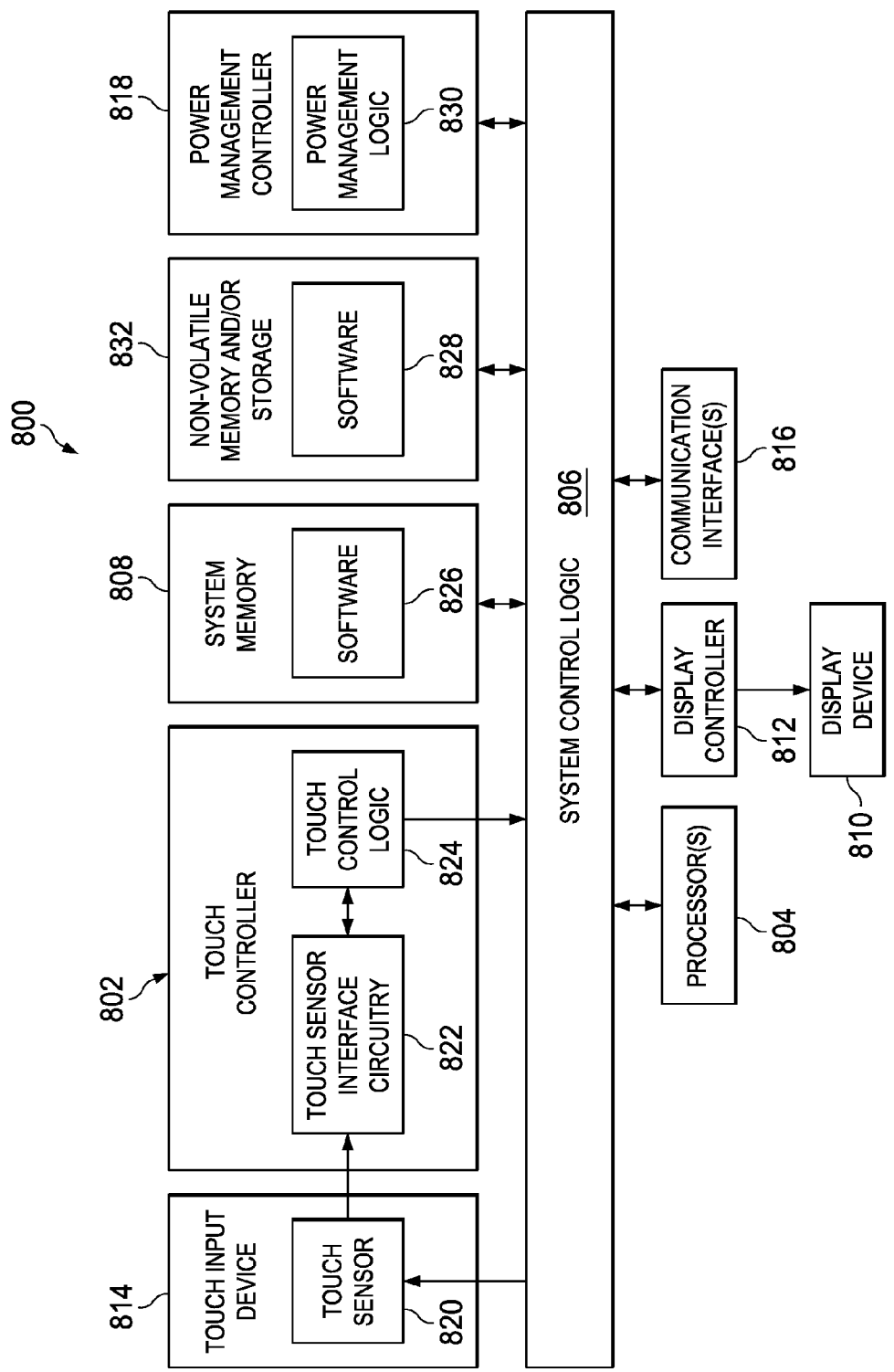
FIG. 8 is a simplified block diagram illustrating example logic that may be used to execute activities associated with the present disclosure.

Turning to FIG. 8, FIG. 8 is a simplified block diagram illustrating potential electronics and logic that may be associated with any of the electronic devices discussed herein. In at least one example embodiment, system 800 can include a touch controller 802, one or more processors 804, system control logic 806 coupled to at least one of processor(s) 804, system memory 808 coupled to system control logic 806, non-volatile memory and/or storage device(s) 832 coupled to system control logic 806, display controller 812 coupled to system control logic 806, display controller 812 coupled to a display device 810, power management controller 818 coupled to system control logic 806, and/or communication interfaces 816 coupled to system control logic 806.

System control logic 806, in at least one embodiment, can include any suitable interface controllers to provide for any suitable interface to at least one processor 804 and/or to any suitable device or component in communication with system control logic 806. System control logic 806, in at least one example embodiment, can include one or more memory controllers to provide an interface to system memory 808. System memory 808 may be used to load and store data and/or instructions, for example, for system 800. System memory 808, in at least one example embodiment, can include any suitable volatile memory, such as suitable dynamic random access memory (DRAM) for example. System control logic 806, in at least one example embodiment, can include one or more I/O controllers to provide an interface to display device 810, touch controller 802, and non-volatile memory and/or storage device(s) 832.

Non-volatile memory and/or storage device(s) 832 may be used to store data and/or instructions, for example within software 828. Non-volatile memory and/or storage device(s) 832 may include any suitable non-volatile memory, such as flash memory for example, and/or may include any suitable non-volatile storage device(s), such as one or more hard disc drives (HDDs), one or more compact disc (CD) drives, and/or one or more digital versatile disc (DVD) drives for example.

Power management controller 818 may include power management logic 830 configured to control various power management and/or power saving functions disclosed herein or any part thereof. In at least one example embodiment, power management controller 818 is configured to reduce the power consumption of components or devices of system 800 that may either be operated at reduced power or turned off when the electronic device is in a closed configuration. For example, in at least one example embodiment, when the electronic device is in a closed configuration, power management controller 818 performs one or more of the following: power down the unused portion of the display and/or any backlight associated therewith; allow one or more of processor(s) 804 to go to a lower power state if less computing power is required in the closed configuration; and shutdown any devices and/or components that are unused when an electronic device is in the closed configuration.

Communications interface(s) 816 may provide an interface for system 800 to communicate over one or more networks and/or with any other suitable device. Communications interface(s) 816 may include any suitable hardware and/or firmware. Communications interface(s) 816, in at least one example embodiment, may include, for example, a network adapter, a wireless network adapter, a telephone modem, and/or a wireless modem.

System control logic 806, in at least one example embodiment, can include one or more I/O controllers to provide an interface to any suitable input/output device(s) such as, for example, an audio device to help convert sound into corresponding digital signals and/or to help convert digital signals into corresponding sound, a camera, a camcorder, a printer, and/or a scanner.

For at least one example embodiment, at least one processor 804 may be packaged together with logic for one or more controllers of system control logic 806. In at least one example embodiment, at least one processor 804 may be packaged together with logic for one or more controllers of system control logic 806 to form a System in Package (SiP). In at least one example embodiment, at least one processor 804 may be integrated on the same die with logic for one or more controllers of system control logic 806. For at least one example embodiment, at least one processor 804 may be integrated on the same die with logic for one or more controllers of system control logic 806 to form a System on Chip (SoC).

For touch control, touch controller 802 may include touch sensor interface circuitry 822 and touch control logic 824. Touch sensor interface circuitry 822 may be coupled to detect touch input over a first touch surface layer and a second touch surface layer of a display (i.e., display device 810). Touch sensor interface circuitry 822 may include any suitable circuitry that may depend, for example, at least in part on the touch-sensitive technology used for a touch input device. Touch sensor interface circuitry 822, in one embodiment, may support any suitable multi-touch technology. Touch sensor interface circuitry 822, in at least one embodiment, can include any suitable circuitry to convert analog signals corresponding to a first touch surface layer and a second surface layer into any suitable digital touch input data. Suitable digital touch input data for at least one embodiment may include, for example, touch location or coordinate data.

Touch control logic 824 may be coupled to help control touch sensor interface circuitry 822 in any suitable manner to detect touch input over a first touch surface layer and a second touch surface layer. Touch control logic 824 for at least one example embodiment may also be coupled to output in any suitable manner digital touch input data corresponding to touch input detected by touch sensor interface circuitry 822. Touch control logic 824 may be implemented using any suitable logic, including any suitable hardware, firmware, and/or software logic (e.g., non-transitory tangible media), that may depend, for example, at least in part on the circuitry used for touch sensor interface circuitry 822. Touch control logic 824 for at least one embodiment may support any suitable multi-touch technology.

Touch control logic 824 may be coupled to output digital touch input data to system control logic 806 and/or at least one processor 804 for processing. At least one processor 804 for at least one embodiment may execute any suitable software to process digital touch input data output from touch control logic 824. Suitable software may include, for example, any suitable driver software and/or any suitable application software. As illustrated in FIG. 8, system memory 808 may store suitable software 826 and/or non-volatile memory and/or storage device(s).

Note that in some example implementations, the functions outlined herein may be implemented in conjunction with logic that is encoded in one or more tangible, non-transitory media (e.g., embedded logic provided in an application-specific integrated circuit (ASIC), in digital signal processor (DSP) instructions, software [potentially inclusive of object code and source code] to be executed by a processor, or other similar machine, etc.). In some of these instances, memory elements can store data used for the operations described herein. This can include the memory elements being able to store software, logic, code, or processor instructions that are executed to carry out the activities described herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a DSP, an erasable programmable read only memory (EPROM), electrically erasable programmable read-only memory (EEPROM)) or an ASIC that can include digital logic, software, code, electronic instructions, or any suitable combination thereof.

It is imperative to note that all of the specifications, dimensions, and relationships outlined herein (e.g., height, width, length, materials, etc.) have only been offered for purposes of example and teaching only. Each of these data may be varied considerably without departing from the spirit of the present disclosure, or the scope of the appended claims. The specifications apply only to one non-limiting example and, accordingly, they should be construed as such. In the foregoing description, example embodiments have been described. Various modifications and changes may be made to such embodiments without departing from the scope of the appended claims. The description and drawings are, accordingly, to be regarded in an illustrative rather than a restrictive sense.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Other Notes and Examples

Example A1 is an electronic device that includes a first housing, a hinge, and a touchscreen, where the touchscreen is rotatably coupled to the first housing using the hinge.

In Example A2, the subject matter of Example A1 may optionally include where the first housing includes a display and the touchscreen can rotate from a front portion of the display when the electronic device is in a tablet configuration into a clamshell configuration.

In Example A3, the subject matter of any of the preceding 'A' Examples can optionally include a projector, where the projector is configured to project a keyboard on the touchscreen when the electronic device is in the clamshell configuration.

In Example A4, the subject matter of any of the preceding 'A' Examples can optionally include a template, where the template is visible through the touchscreen when the electronic device is in the clamshell configuration.

In Example A5, the subject matter of any of the preceding 'A' Examples can optionally include where the template is on an opposite side of the display when the electronic device is in a tablet configuration.

In Example A6, the subject matter of any of the preceding 'A' Examples can optionally include where the template can be removed and replaced with a second template.

In Example A7, the subject matter of any of the preceding 'A' Examples can optionally include a haptic surface between the touchscreen and the template when the electronic device is in a clamshell configuration.

In Example A8, the subject matter of any of the preceding 'A' Examples can optionally include where the haptic surface can be removed and replaced with a second haptic surface.

Example M1 is a method that includes rotating a touchscreen away from a first housing, where the touchscreen is coupled to the first housing using a hinge.

In Example M2, the subject matter of any of the preceding 'M' Examples can optionally include where the first housing includes a display and the touchscreen can rotate from a front portion of the display when the touchscreen is in a tablet configuration into a clamshell configuration.

In Example M3, the subject matter of any of the preceding 'M' Examples can optionally include projecting a keyboard onto the touchscreen when the touchscreen is in the clamshell configuration.

In Example M4, the subject matter of any of the preceding 'M' Examples can optionally include viewing a template through the touchscreen when the touchscreen is in the clamshell configuration.

In Example M5, the subject matter of any of the preceding 'M' Examples can optionally include where the template is on an opposite side of the display when the touchscreen is in a tablet configuration.

In Example M6, the subject matter of any of the preceding 'M' Examples can optionally include removing the template and replacing the template with a second template that can be viewed through the touchscreen when the touchscreen is in the clamshell configuration.

In Example M7, the subject matter of any of the preceding 'M' Examples can optionally include positioning a haptic surface under the touchscreen when the touchscreen is in the clamshell configuration.

Example AA1 can include an electronic device that includes a first housing, a hinge, a touchscreen, where the touchscreen is rotatably coupled to the first housing using the hinge, and a template that can be viewed through or on the touchscreen when the electronic device is in a clamshell configuration.

In Example AA2, the subject matter of any of the preceding 'AA' Examples can optionally include a projector, where the projector is configured to project a keyboard on the touchscreen when the electronic device is in the clamshell configuration.

In Example AA3, the subject matter of any of the preceding 'AA' Examples can optionally include where the template is visible through the touchscreen when the electronic device is in the clamshell configuration.

In Example AA4, the subject matter of any of the preceding 'AA' Examples can optionally include where the template can be removed and replaced with a second template.

An example system S1 can include means for rotating a touchscreen away from a first housing, where the first housing includes a display and the touchscreen can rotate from a front of the display when the touchscreen is in a tablet configuration to a clamshell configuration.

In Example S2, the subject matter of any of the preceding 'S' Examples can optionally include means for viewing a template through or on the touchscreen when the touchscreen is in the clamshell configuration.

In Example S3, the subject matter of any of the preceding 'S' Examples can optionally include means for projecting a keyboard on the touchscreen when the touchscreen is in the clamshell configuration.

In Example S4, the subject matter of any of the preceding 'S' Examples can optionally include means for positioning a template behind the touchscreen, where the template is visible through the touchscreen when the touchscreen is in the clamshell configuration.

In Example S5, the subject matter of any of the preceding 'S' Examples can optionally include where the template can be removed and replaced with a second template.

In Example S6, the subject matter of any of the preceding 'S' Examples can optionally include means for providing haptic effects to the touchscreen when the touchscreen is in the clamshell configuration.

Example X1 is a machine-readable storage medium including machine-readable instructions to implement a method or realize an apparatus as in any one of the Examples A1-A8, M1-M7, and AA1-AA4. Example Y1 is an apparatus comprising means for performing of any of the Example methods M1-M6. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. An electronic device, comprising:
   a first housing, wherein the first housing includes a display, a top portion, and a bottom portion;
   a hinge located on the bottom portion of the first housing;
   a touchscreen, wherein the touchscreen is rotatably coupled to the first housing using the hinge and the touchscreen can rotate from a front portion of the display when the electronic device is in a tablet configuration into a clamshell configuration, wherein the touchscreen is configured as a virtual keyboard in the clamshell configuration; and
   a kickstand, wherein the kickstand is located on a side of the first housing that is opposite the front portion of the display where the touchscreen is located.

2. The electronic device of claim 1, further comprising:
   a projector located on the bottom portion of the first housing, wherein the projector is configured to project a keyboard on the touchscreen when the electronic device is in the clamshell configuration.

3. The electronic device of claim 1, further comprising:
   a template, wherein the template is visible through the touchscreen when the electronic device is in the clamshell configuration.

4. The electronic device of claim 3, wherein the template is on an opposite side of the display when the electronic device is in a tablet configuration.

5. The electronic device of claim 4, wherein the template can be removed and replaced with a second template.

6. The electronic device of claim 3, further comprising:
a haptic surface between the touchscreen and the template when the electronic device is in a clamshell configuration.

7. The electronic device of claim 1, wherein the haptic surface can be removed and replaced with a second haptic surface.

8. The electronic device of claim 1, further comprising:
a touchscreen support, wherein the touchscreen support is located on a side of the first housing that is opposite the front portion of the display where the touchscreen is located and the touchscreen support can rotate to support the touchscreen when the electronic device is in the clamshell configuration.

9. A method, comprising:
rotating a touchscreen away from the first housing, wherein the first housing includes a top portion and a bottom portion, wherein the touchscreen is coupled to the first housing using a hinge located on the bottom portion of the first housing and the touchscreen can rotate from a front portion of a display when the touchscreen is in a tablet configuration into a clamshell configuration, wherein the touchscreen is configured as a virtual keyboard in the clamshell configuration, and wherein the first housing includes a kickstand, wherein the kickstand is located on a side of the first housing that is opposite the front portion of the display where the touchscreen is located.

10. The method of claim 9, further comprising:
projecting a keyboard onto the touchscreen using a projector when the touchscreen is in the clamshell configuration, wherein the projector is located on the bottom portion of the first housing.

11. The method of claim 9, further comprising:
viewing a template through the touchscreen when the touchscreen is in the clamshell configuration.

12. The method of claim 11, wherein the template is on an opposite side of the display when the touchscreen is in a tablet configuration.

13. The method of claim 11, further comprising:
removing the template; and
replacing the template with a second template that can be viewed through the touchscreen when the touchscreen is in the clamshell configuration.

14. The method of claim 9, further comprising:
positioning a haptic surface under the touchscreen when the touchscreen is in the clamshell configuration.

15. An electronic device, comprising:
a first housing, wherein the first housing includes a display, a top portion, and a bottom portion;
a hinge located on the bottom portion of the first housing;
a touchscreen, wherein the touchscreen is rotatably coupled to the first housing using the hinge and the touchscreen can rotate from a front portion of the display when the electronic device is in a tablet configuration into a clamshell configuration, wherein the touchscreen is configured as a virtual keyboard in the clamshell configuration;
a template that can be viewed through or on the touchscreen when the electronic device is in a clamshell configuration; and
a kickstand, wherein the kickstand is located on a side of the first housing that is opposite the front portion of the display where the touchscreen is located.

16. The electronic device of claim 15, further comprising:
a projector located on the bottom portion of the first housing, wherein the projector is configured to project a keyboard on the touchscreen when the electronic device is in the clamshell configuration.

17. The electronic device of claim 16, wherein the template is visible through the touchscreen when the electronic device is in the clamshell configuration.

18. The electronic device of claim 15, wherein the template can be removed and replaced with a second template.

19. A system, comprising:
means for rotating a touchscreen away from a first housing, wherein the first housing includes a display, a top portion, and a bottom portion, wherein the touchscreen can rotate about the bottom portion from a front of the display when the touchscreen is in a tablet configuration to a clamshell configuration, wherein the touchscreen is configured as a virtual keyboard in the clamshell configuration; and
means for rotating a kickstand away from the first housing, wherein the kickstand is located on a side of the first housing that is opposite the front portion of the display where the touchscreen is located.

20. The system of claim 19, further comprising:
means for viewing a template through or on the touchscreen when the touchscreen is in the clamshell configuration.

21. The system of claim 20, further comprising:
means for projecting a keyboard on the touchscreen using a projector when the touchscreen is in the clamshell configuration, wherein the projector is located on the bottom portion of the first housing.

22. The system of claim 20, further comprising:
means for positioning a template behind the touchscreen, wherein the template is visible through the touchscreen when the touchscreen is in the clamshell configuration.

23. The system of claim 20, wherein the template can be removed and replaced with a second template.

24. The system of claim 19, further comprising:
means for providing haptic effects to the touchscreen when the touchscreen is in the clamshell configuration.

* * * * *